(12) United States Patent
Su et al.

(10) Patent No.: US 11,272,213 B2
(45) Date of Patent: Mar. 8, 2022

(54) BACKWARD COMPATIBLE DISPLAY MANAGEMENT METADATA COMPRESSION

(71) Applicant: Dolby Laboratories Licensing Corporation, San Francisco, CA (US)

(72) Inventors: Guan-Ming Su, Fremont, CA (US); Neeraj J. Gadgil, Sunnyvale, CA (US); Tao Chen, Palo Alto, CA (US); Sheng Qu, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/649,604

(22) PCT Filed: Sep. 21, 2018

(86) PCT No.: PCT/US2018/052292
§ 371 (c)(1),
(2) Date: Mar. 20, 2020

(87) PCT Pub. No.: WO2019/060778
PCT Pub. Date: Mar. 28, 2019

(65) Prior Publication Data
US 2020/0413099 A1    Dec. 31, 2020

Related U.S. Application Data

(60) Provisional application No. 62/561,782, filed on Sep. 22, 2017.

(30) Foreign Application Priority Data

Sep. 22, 2017 (EP) ..................................... 17192724

(51) Int. Cl.
*H04N 19/70*    (2014.01)
*H04N 19/132*   (2014.01)
(Continued)

(52) U.S. Cl.
CPC .......... *H04N 19/70* (2014.11); *H04N 19/132* (2014.11); *H04N 19/68* (2014.11); *H04N 19/89* (2014.11)

(58) Field of Classification Search
CPC ........ H04N 19/68; H04N 19/70; H04N 19/89; H04N 19/132; H04N 19/463
See application file for complete search history.

(56) References Cited

U.S. PATENT DOCUMENTS

| | | | |
|---|---|---|---|
| 2011/0206118 A1 | 8/2011 | Bivolarsky | |
| 2013/0271569 A1* | 10/2013 | Ohbitsu | H04N 19/70 348/43 |
| 2014/0036999 A1* | 2/2014 | Ryu | H04N 19/70 375/240.12 |

(Continued)

FOREIGN PATENT DOCUMENTS

| | | |
|---|---|---|
| EP | 2866450 | 4/2015 |
| WO | 2017079132 | 5/2017 |

OTHER PUBLICATIONS

Oh et al., (Joint Collaborative Team on Video Coding of ISO/IEC JTC1/SC29/WG11 and ITU-T SG. 16; Supplemental Enhancement Information Set SEI Message; 28. JCT-VC meeting; Jul. 15, 2017-Jul. 21, 2017; Torino; pp. 1-4; URL: http://wftp3.itu.int/av-arch/jctvc-site/, Jul. 18, 2017). (Year: 2017).*

(Continued)

*Primary Examiner* — Peet Dhillon

(57) ABSTRACT

Sequence-level parameters are generated for an image frame sequence including sequence-level indicators for indicating metadata types present for each image frame in the sequence of image frames. Frame-present parameters are generated for a specific image frame in the sequence including frame-present indicators corresponding to the metadata types as indicated in the sequence-level parameters. The frame-present indicators identify first metadata types for which metadata parameter values are to be encoded in a coded bitstream as metadata payloads. The image frame sequence, (Continued)

the sequence-level parameters, the frame-present parameters and the metadata payloads are encoded in the coded bitstream. A recipient device can generate, from the specific image frame based partly on the metadata parameter values determined for the first metadata types, a target display image for a target display.

18 Claims, 8 Drawing Sheets

(51) Int. Cl.
*H04N 19/68* (2014.01)
*H04N 19/89* (2014.01)

(56) References Cited

U.S. PATENT DOCUMENTS

| | | | | |
|---|---|---|---|---|
| 2016/0134902 A1* | 5/2016 | Tsukagoshi | ........ | H04N 21/2362 725/116 |
| 2018/0278967 A1* | 9/2018 | Kerofsky | ............. | H04N 19/186 |
| 2018/0288715 A1* | 10/2018 | Ye | ......................... | H04B 17/318 |
| 2018/0302627 A1* | 10/2018 | Larbier | ................ | H04N 19/136 |
| 2018/0352260 A1* | 12/2018 | Ishida | .................. | H04N 19/114 |

OTHER PUBLICATIONS

Dolby: "Dolby vision (TM) for the Home 2 What is Dolby Vision?" Jan. 1, 2016.
Francois E. et al "Signalling, Backward Compatibility, and Display Adaptation for HDR/WCG Video Draft 1" JCT-VC Meeting, Oct. 2016.
ITU-R BT.1886 "Reference Electro-Optical Transfer Function for Flat Panel Displays Used in HDTV Studio Production" p. 1-7.
Oh, H.M. et al "Supplemental Enhancement Information set SEI Message" JCT-VC Meeting, Jul. 2017.
Smpte ST 2084:2014 "High Dynamic Range Electro-Optical Transfer Function of Mastering Reference Displays".

* cited by examiner

```
┌─────────────────────────────────────┐
│   generate sequence-level parameters for │
│          image frames 402           │
└─────────────────────────────────────┘
                  │
┌─────────────────────────────────────┐
│      generate sets of frame-present │
│   parameters for the image frames 404│
└─────────────────────────────────────┘
                  │
┌─────────────────────────────────────┐
│  encode a specific image frame, specific│
│  Sequence-level parameters, specific frame-│
│  present parameters and metadata payloads in a│
│         coded bitstream 406         │
└─────────────────────────────────────┘
                  │
┌─────────────────────────────────────┐
│ cause a recipient device of the coded bitstream to│
│ generate, from the specific image frame, a target│
│     display image for a target display│
│                 408                 │
└─────────────────────────────────────┘
```

BACKWARD COMPATIBLE DISPLAY MANAGEMENT METADATA COMPRESSION

CROSS REFERENCE TO RELATED APPLICATIONS

This application may be related to U.S. Provisional Patent Application Ser. No. 62/561,782, and European Patent Application 17192724.7, both filed on 22 Sep. 2017, each incorporated herein by reference in its entirety.

TECHNOLOGY

The present invention relates generally to images. More particularly, an embodiment of the present invention relates to backward compatible display management (DM) metadata compression.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF is typically embedded in the bitstream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Displays that support luminance of 200 to 1,000 cd/m$^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays" (hereinafter "SMPTE"), which is incorporated herein by reference in its entirety. As appreciated by the inventors here, improved techniques for encoding and decoding video data that can be used to support display capabilities of a wide variety of SDR and HDR display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 4A and FIG. 4B illustrate example process flows; and

DESCRIPTION OF EXAMPLE EMBODIMENTS

Figure 1:
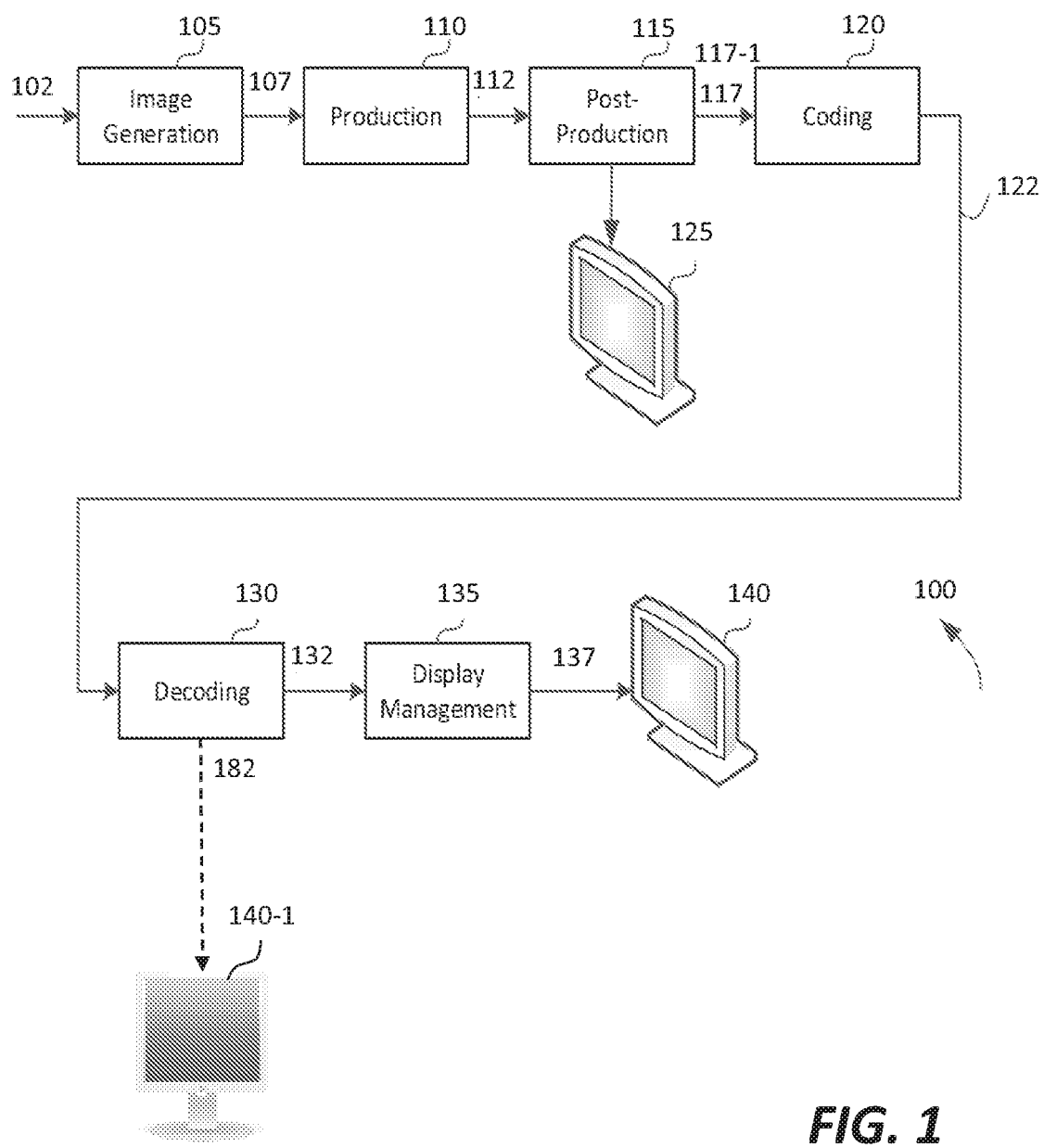
FIG. 1 depicts an example process of a video delivery pipeline.

Backward compatible DM metadata compression is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to encoding video data with image metadata. These example embodiments may further relate to backwards-compatible compression of image metadata (such as display management metadata, for example). A set of sequence-level parameters is generated for a sequence of image frames in a media program, the set of sequence-level parameters comprising a set of sequence-level indicators for indicating a specific set of metadata types that are present for each image frame in the sequence of image frames (e.g., that are present for the image frames in the entire sequence of image frames). A sequence of sets of frame-present parameters is generated for the sequence of image frames, each set of frame-present parameters in the sequence of sets of frame-present parameters being generated for a respective image frame in the sequence of image frames. A specific set of frame-present parameters generated for a specific image frame in the sequence of image frames comprises a specific set of frame-present indicators corresponding to the specific set of metadata types as indicated in the set of sequence-level parameters. Therein, each frame-present indicator may correspond to a respective one among the specific set of metadata types as indicated in the set of sequence level parameters. In other words, the frame-present indicators may be in a one-to-one relationship with the metadata types in the specific set of metadata types as indicated in the set of sequence level parameters. The set of frame-present indicators includes first frame-present indicators identifying first metadata types for which metadata parameter values are to be encoded, for the specific image frame, in a coded bitstream as metadata payloads. The specific set of frame-present indicators includes second frame-present indicators identifying second metadata types for which no metadata parameter values are to be encoded, for the specific image frame, in the coded bitstream. The sequence of image frames, the set of sequence-level parameters, the specific set of frame-present parameters and the metadata payloads are encoded in the coded bitstream. The encoded metadata (encoded metadata payloads) may be suitable to cause a recipient device of the coded bitstream to generate, from the specific image frame based at least in part on the metadata parameter values determined for the first metadata types, a target display image for a target display.

Example embodiments described herein relate to decoding video data with image metadata. These example embodiments may further relate to decompression of image metadata (such as display management metadata, for example). A coded bitstream comprising a sequence of image frames in a media program is received. A set of sequence-level parameters is decoded for the sequence of image frames, the set of sequence-level parameters comprising a set of sequence-level indicators for indicating a specific set of metadata types that are present for each image frame in the sequence of image frames (e.g., that are present for the image frames in the entire sequence of image frames). The set of sequence-level parameters is used to decode a specific set of frame-present parameters that were generated for a specific image frame in the sequence of image frames. The specific set of frame-present parameters comprises a specific set of frame-present indicators corresponding to the specific set of metadata types as indicated in the set of sequence-level parameters. Therein, each frame-present indicator may correspond to a respective one among the specific set of metadata types as indicated in the set of sequence level parameters. In other words, the frame-present indicators may be in a one-to-one relationship with the metadata types in the specific set of metadata types as indicated in the set of sequence level parameters. The specific set of frame-present indicators includes first frame-present indicators identifying first metadata types for which metadata parameter values were encoded in the coded bitstream as metadata payloads. The specific set of frame-present indicators includes second frame-present indicators identifying second metadata types for which no metadata parameter values have been encoded in the coded bitstream. The first frame-present indicators is used to decode the metadata payload in the coded bitstream. A target display image for a target display is generated from the specific image frame based at least in part on the metadata parameter values determined for the first metadata types.

Example Video Delivery Processing Pipeline

FIG. 1 depicts an example process of a video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide the video data (107). In a production phase (110), the video data (107) is edited to provide a video production stream (112).

Figure 2A:
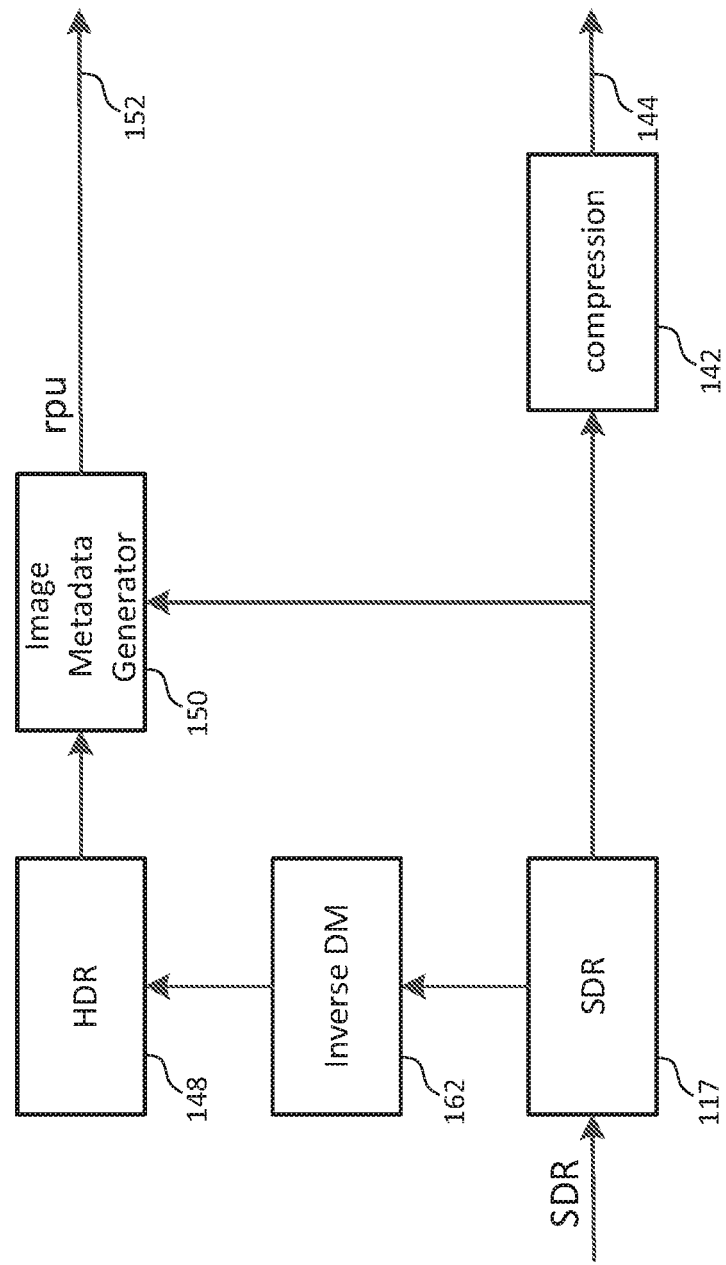
FIG. 2A through FIG. 2C illustrate example single-layer codec frameworks.
Figure 2B:
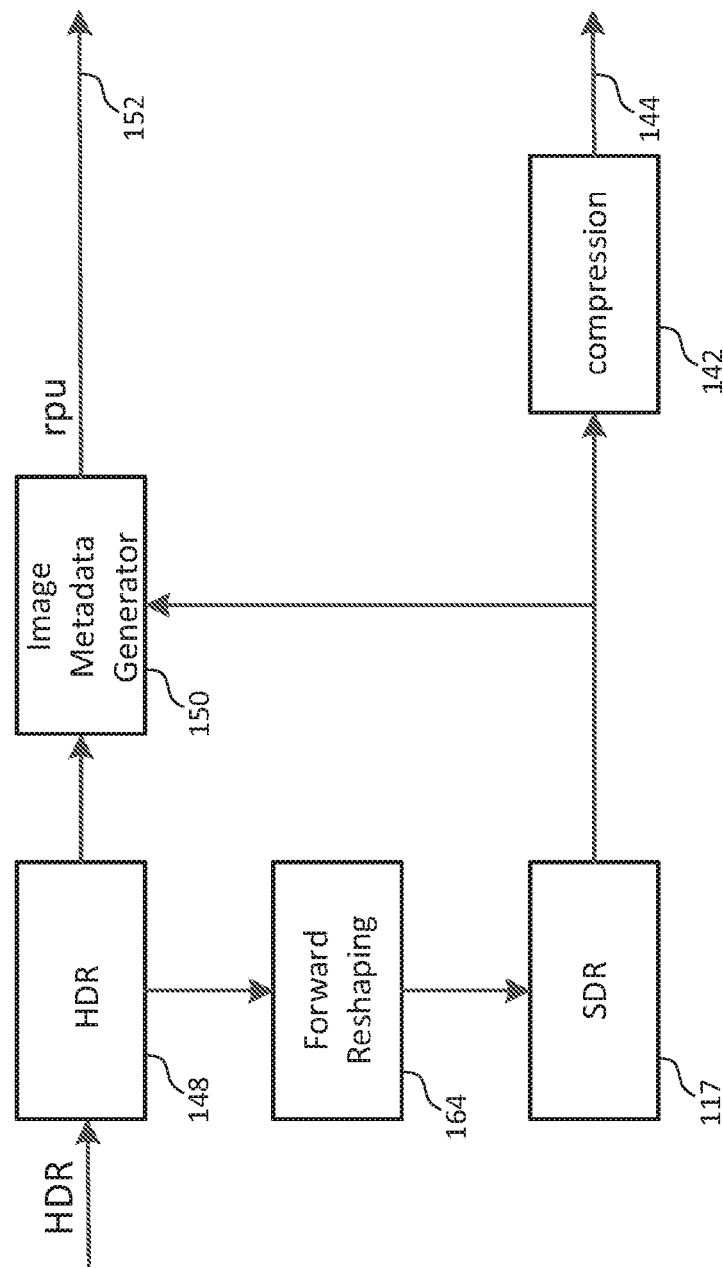

The video data of the production stream (112) is then provided to a processor for post-production editing (115). The post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, manual and/or automatic scene cut information generation, image cropping, addition of computer-generated visual special effects, etc.) may be performed at the post-production editing (115) to yield a release version of HDR images (117-1) or SDR (or relatively narrow dynamic range) images (117) (e.g., SDR, etc.). In some embodiments, during post-production editing (115), the HDR images (117-1) are viewed on a reference HDR display that supports the high dynamic range by a colorist who is performing post-production editing operations on the HDR images (117-1). In some other embodiments, during post-production editing (115), the SDR images (117) are viewed on a reference display (125) that supports the standard dynamic range (or a relatively narrow dynamic range) by a colorist who is performing post-production editing operations on the SDR images (117). In some embodiments, the coding block (120) may implement a single layer codec framework such as illustrated in FIG. 2A or FIG. 2B. In operational scenarios in which the coding block (120) receives the HDR images (117-1) from the post-production editing (115), the HDR images (117-1) may be forward reshaped by the coding block (120) into SDR images (e.g., 117).

The SDR images (117) are compressed by the coding block (120) into a coded bitstream (122). In some embodiments, the coding block (120) may include audio and video encoders, such as those defined by ATSC, DVB, DVD, Blu-Ray, and other delivery formats, to generate the coded bitstream (122).

In some embodiments, the coded bitstream (122) is encoded with the SDR images (117) that preserve the artistic intent with which the SDR images (117) are generated in the post-production editing (115).

The SDR images (117) may be encoded into video data in a video signal (e.g., an 8-bit SDR video signal, a 10-bit SDR video signal, etc.) that is backward compatible (or alternatively non-backward compatible) with a wide variety of SDR display devices (e.g., SDR displays, etc.). In a non-limiting example, the video signal encoded with the SDR images (117) may be a single-layer backward compatible (or alternatively non-backward compatible) video signal.

In some embodiments, the coded bitstream (122) is a video signal in compliance with the same video signal format as the input SDR YCbCr video signal received by coding block (120). For example, in cases where the input SDR YCbCr video signal received by the coding block (120) is an 8-bit SDR YCbCr video signal, the coded bitstream (122) outputted by coding block (120) may represent an output 8-bit SDR YCbCr video signal with the image metadata including but not limited to the DM metadata as generated by coding block (120).

Additionally, optionally, or alternatively, the coded bit stream (122) is further encoded with image metadata including but not limited to composer metadata (or backward reshaping mappings) that can be used by downstream decoders to perform backward reshaping on the SDR images (117) in order to generate backward reshaped images that may be optimized for rendering on HDR display devices. In some embodiments, the backward reshaped images may be generated from the SDR images (117) (or a decoded version thereof) using one or more SDR-to-HDR conversion tools implementing inverse tone mapping, inverse display management, etc.

The coded bitstream (122) is then delivered downstream to decoding and playback devices such as television sets, set-top boxes, movie theaters, and the like. In a receiver (or a downstream device), the coded bitstream (122) is decoded by decoding block (130) to generate decoded images 132, which may be the same as the SDR images (117), subject to quantization errors generated in compression performed by the coding block (120) and decompression performed by the decoding block (130). In scenarios in which the first target display (140-1) supports the standard dynamic range (or the relatively narrow dynamic range), the SDR images (117) edited with the artistic content as represented in the decoded images (182) are directly watchable on a first target display (140-1), which may be of similar characteristics as the reference display (125). In some embodiments, the receiver may be attached to a second target display (140), which supports the high dynamic range in which the HDR images are represented. In that case, the decoding block (130) may perform backward reshaping, based on the composer metadata received along with the SDR images (117), on the SDR images (117) into backward reshaped images (132) that are optimized for viewing on HDR displays. Additionally, optionally, or alternatively, a display management block (135)—which may be in the receiver, in the target display (140), or in a separate device—further adjusts the backward reshaped images (132) to characteristics of the second target display (140) by generating display-mapped signal (137) adapted to the characteristics of the second target display (140).

Delivery of SDR or Non-SDR Content with Compressed Metadata

Techniques as described herein can be used to significantly compress image metadata including but not limited to DM metadata used in DM operations. These techniques are well suited for a wide range of different operational scenarios, and may be used to compress the image metadata so as to significantly minimize overheads in transmitting the image metadata and thus to enable the image metadata and image data to be transmitted at relatively low bit rates. In some example embodiments, the techniques as described herein may be made to compress the image metadata that accompanies the SDR images (117), including but not limited to the DM metadata to allow the SDR images with the SDR image (117) and the image metadata to be transmitted in the coded bitstream (122) under relatively low bit rates.

Since a great number of videos/movies have been created, stored, and/or published in the world in the past several decades as SDR content encoded for transmission at relatively low bit rates, the techniques as described herein can be used to generate significantly compressed image metadata in coded streams that carry, or are backward compatible with, a wide range of previously created SDR content. As a result, the image metadata can carry a (comparatively) relatively large amount of data to enable optimizing image processing operations including but not limited to DM operations for a wide variety of display devices and/or media players.

Additionally, optionally, or alternatively, these techniques can also be extended to generate significantly compressed image metadata in coded streams that may or may not be single layer video signals. Additionally, optionally, or alternatively, these techniques can also be extended to generate significantly compressed image metadata in coded streams that may be used for generating SDR, non-SDR or HDR content from the coded bitstreams.

In some embodiments, the compression of the image metadata may be realized using extension blocks (or metadata blocks) that are supported by a wide variety of media processing devices in the field or in new deployments. More specifically, the extension blocks can be used to compress image metadata that accompanies previously created SDR content, and may also be used to compress present or future image metadata that accompanies present or future SDR (or even non-SDR media content) encoded at a wide variety of bit rates. In some embodiments, at least a part (e.g., client-side, decoder-side, etc.) of the techniques can be implemented by or deployed in a wide variety of TVs, mobile devices, set-top boxes, smart players, and so forth, to receive and make use of significantly compressed image metadata that accompanies SDR (or even non-SDR content) in a wide variety of image processing operations including but not limited to DM operations.

Furthermore, in operational scenarios in which SDR content is specifically optimized for SDR display devices, such (e.g., backward compatible, etc.) SDR content can be delivered to a wide variety of downstream decoding devices, including but not limited to those devices that only support SDR rendering. These devices can ignore any parts (e.g., unsupported DM extension blocks, etc.) of image metadata that accompany the SDR content and that are not supported by the devices.

For example, a first device with a first decoder (e.g., a decoder already deployed in the field, etc.) that receives a coded bitstream containing image metadata in a compression format as described herein may not recognize some relatively new extension blocks used to compress the image metadata and can fall back to use default values (e.g., DM static values, etc.) known or accessible to the device. The first decoder can keep decoding and processing other parts of the image metadata in the compression format that are supported by the first decoder.

In comparison, a second device with a second decoder (e.g., a newly released decoder, etc.) that receives such a coded bitstream can recognize the relatively new extension blocks, and can decompress the compressed image metadata in the coded bitstream and perform image processing operations (e.g., DM operations, etc.) based on dynamic or passed-in values in the relatively new extension blocks. The compression format such as the relatively new extension blocks may be implemented by or deployed in a wide variety of TVs, mobile devices, set-top boxes, smart players, and so forth, to receive and make use of significantly compressed image metadata that accompanies SDR or non-SDR content in a wide variety of image processing operations including but not limited to DM operations.

Codec Architecture(s)

Figure 2C:
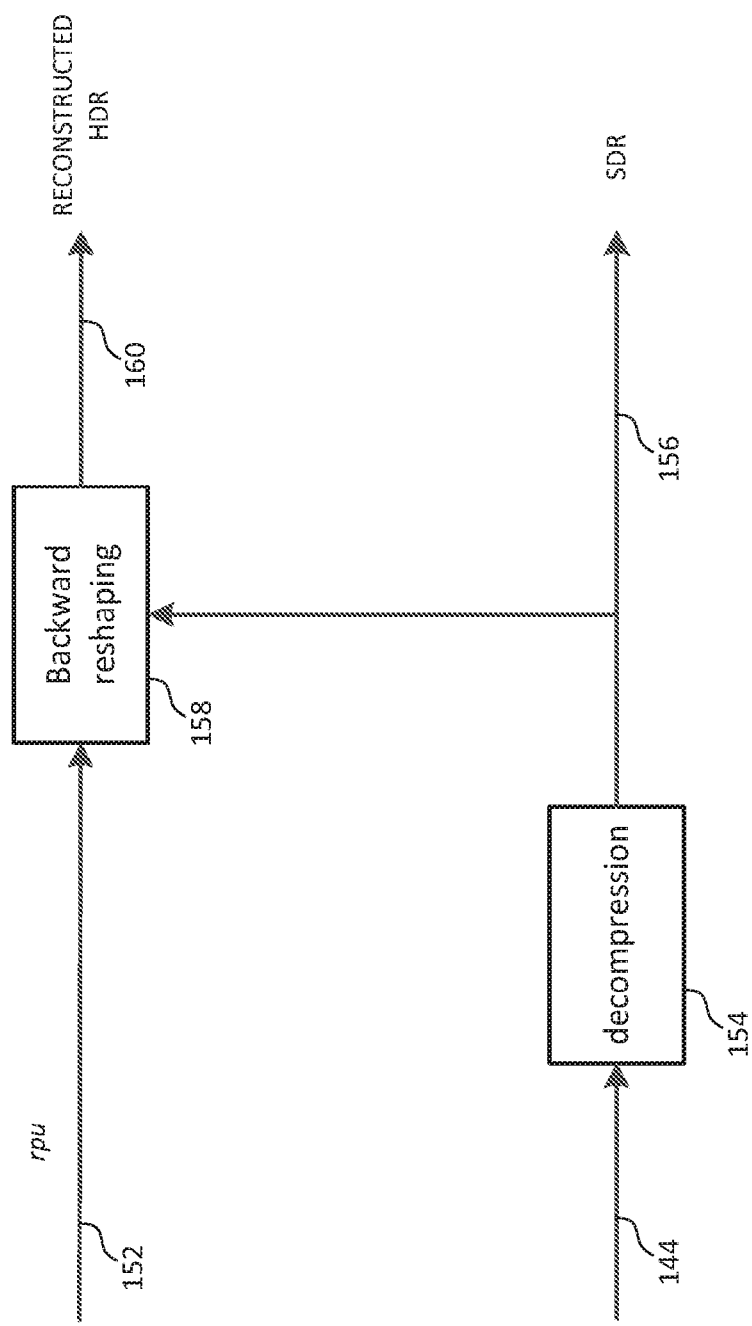

FIG. 2A through FIG. 2C illustrate example single-layer codec frameworks. More specifically, FIG. 2A illustrates an example of a single-layer inverse display management (SLiDM) encoder-side codec architecture, which may be implemented with one or more computing processors in an upstream video encoder, etc. FIG. 2B illustrates an example of a single-layer display management (SLDM) encoder-side codec architecture, which may be implemented with one or more computing processors in an upstream video encoder, etc. FIG. 2C illustrates an example of a decoder-side codec architecture, which may also be implemented with one or more computing processors in one or more downstream video decoders, etc., and which can operate with either an SLiDM encoder or a SLDM encoder.

In the SLiDM framework, as illustrated in FIG. 2A, backward compatible SDR images such as the SDR images (117), etc., are received as input on the encoder side of the codec framework. Here, "backward compatible SDR images" may refer to SDR images that are specifically optimized or color graded for SDR displays.

By way of illustration but not limitation, an inverse dynamic-range mapping (DM) module 146—which may represent a SDR-to-HDR conversion tool, etc.—is used to convert the SDR images (117) to HDR images 148 that are optimized for viewing on reference HDR displays. In some embodiments, the inverse-DM module may also be referred to as an inverse tone-mapping tool.

In the SLDM framework as illustrated in FIG. 2B, the HDR images (148) such as those optimized for reference HDR displays, etc., are received as input on the encoder side of the codec framework. Here, "HDR images optimized for reference HDR displays" may refer to HDR images that are specifically color graded for HDR displays.

By way of illustration but not limitation, a forward reshaping module 164—which may represent a HDR-to-SDR conversion tool, etc.—is used to convert the HDR images (148) to the SDR images (117) that are optimized for viewing on SDR displays. In some embodiments, the forward reshaping module may also be referred to as a tone-mapping tool.

In both SLiDM and SLDM framework, an image metadata generator 150 (e.g., a part of the coding block (120), etc.) receives both of the SDR images (117) and the HDR images (148) as input, generates image metadata 152 such as composer metadata, DM metadata, and so forth. For example, the image metadata generator (150) can perform optimization to find out optimal backward reshaping functions such that backward reshaped images generated by backward reshaping the SDR images (117) with the optimal backward reshaping functions are as close to the HDR images (148) as possible. The optimal backward reshaping functions may be represented or specified with the composer metadata in the image metadata 152. Additionally, optionally or alternatively, the image metadata generator (150) generates the DM metadata based on one or more of the HDR images (148), the backward reshaped images, or the SDR images (117) (through approximation methods, etc.). The DM metadata may be used by a recipient device to perform DM operations, for example on the reconstructed HDR images to generate display images for display devices that may be different from the reference HDR displays.

In both SLiDM and SLDM framework, a compression block 142 (e.g., a part of the coding block (122) of FIG. 1, etc.) compresses/encodes the SDR images (117) in a single layer 144 of a video signal. An example video signal may be, but is not necessarily limited to only, the coded bitstream (122) of FIG. 1. The image metadata (152) (denoted as "rpu"), as generated by the image metadata generator (150) based on the SDR images (117), the HDR images (148), the backward reshaped images, etc., may be encoded (e.g., by the coding block (122) of FIG. 1, etc.) into the video signal.

In both SLiDM and SLDM framework, the image metadata (152) may be separately carried in the video signal from the single layer in which the SDR images are encoded in the video signal. For example, the image metadata (152) may be encoded in a component stream in the coded bitstream, which component stream may or may not be separate from the single layer (of the coded bitstream) in which the SDR images (117) are encoded.

In both SLiDM and SLDM framework, the encoder-side architectures can be used to avoid directly encoding the HDR images (148) into coded/compressed HDR images in the video signal; instead, the composer metadata in the image metadata (152) in the video signal can be used to enable downstream decoding devices to backward reshape the SDR images (117) (which are encoded in the video signal) into reconstructed images that are identical to or closely/optimally approximate the HDR images (148).

In both SLiDM and SLDM framework, SDR content is encoded and transmitted, in a single layer of a video signal such as the code bit stream (122), etc., by an upstream encoding device that implements the encoder-side codec architecture. The SDR content is received and decoded, in the single layer of the video signal, by a downstream decoding device that implements the decoder-side codec architecture. Composer metadata is also encoded and transmitted in the video signal with the SDR content so that HDR display devices can reconstruct HDR content based on the SDR content and the composer metadata.

In some embodiments, as illustrated in FIG. 2C, the video signal encoded with the SDR images (117) in the single layer (144) and the backward reshaping metadata (152) as a part of the overall image metadata are received as input on the decoder side of the SLiDM or SLDM codec framework.

A decompression block 154 (e.g., a part of the decoding block (130) of FIG. 1, etc.) decompresses/decodes compressed video data in the single layer (144) of the video signal into the decoded SDR images (182). The decoded SDR images (182) may be the same as the SDR images (117), subject to quantization errors in the compression block (142) and in the decompression block (154), which may have been optimized for SDR display devices. The decoded SDR images (182) may be outputted in an output SDR video signal 156 (e.g., over an HDMI interface, over a video link, etc.) to and rendered on an SDR display device.

In addition, a backward reshaping block 158 extracts the image metadata (152) from the input video signal, constructs the optimal backward reshaping functions based on the composer metadata in the image metadata (152), and performs backward reshaping operations on the decoded SDR images (117) based on the optimal backward reshaping functions to generate the backward reshaped images (132) (or reconstructed HDR images). In some embodiments, the backward reshaped images represent production-quality or near-production-quality HDR images that are identical to or closely/optimally approximating the HDR images (148). The backward reshaped images (132) may be outputted in an output HDR video signal 160 (e.g., over an HDMI interface, over a video link, etc.) to and rendered on an HDR display device.

In some embodiments, display management operations specific to the HDR display device may be performed on the backward reshaped images (132) based at least in part on the DM metadata in the image metadata (152), for example to generate display images to be rendered.

For the purpose of illustration, single layer codec architectures have been described. It should be noted that techniques as described herein can be used in different single-layer codec architectures other than those illustrated in FIG. 2A through FIG. 2C. Additionally, optionally or alternatively, these techniques can be used in multi-layer codec architectures. Thus, these and other variations of single-layer or multi-layer codec architectures may operate with some or all of the techniques as described herein.

Backward Compatibility, Flexibility, and Compression Efficiency

In some embodiments, compression methods under techniques as described herein may use extension blocks to compress image metadata including but not limited to DM metadata. The DM metadata that is to be compressed into the extension blocks may comprise some or all of metadata parameters at different DM levels.

For example, L0 metadata may be used to provide/describe information about a dynamic range of a source (or reference) display for which image data or some or all of the DM metadata is generated.

Level 1 (L1) metadata may be used to provide/describe information about a distribution of luminance values in a source image (e.g., an EDR image, etc.), a source scene (e.g., a scene depicted in EDR images, etc.), a source GOP (e.g., a group of pictures in EDR images, etc.), etc., which may be represented in the coded bitstream (122).

Level 2 (L2) metadata may be used to provide/describe information about video characteristic adjustments that are originated from, or traced back to, adjustments made by a director, a color grader, a video professional, etc., in a production studio with a reference display (e.g., the reference display (125), a reference EDR display, etc.) with a reference dynamic range (e.g., SDR, EDR, etc.).

Level 3 (L3) metadata may be used to provide/describe information about video characteristic adjustments that are originated from, or traced back to, adjustments made by a director, a color grader, a video professional, etc., in a production studio with a second reference display with a second reference dynamic range different from the reference dynamic range.

Level 4 (L4) metadata may be used to provide/describe information used for local dimming operations.

Additionally, optionally or alternatively, non-DM metadata, other DM metadata, and/or metadata parameters at DM levels other than the above described DM levels, may be used by image processing operations and/or DM operations as described herein.

In some embodiments, the compression methods perform lossy compression on some or all of the DM metadata such as level 1 (L1) and level 4 (L4) metadata, based on temporal domain prediction (or prediction in time domain).

Under other approaches that do not implement techniques as described herein, extension block used to carry image metadata would use significant overheads; thus, relatively high bit rates may be needed to deliver metadata of a (DM) level represented in the DM metadata. The overheads become even larger when delivering metadata of multiple (DM) levels in the DM metadata. In addition, the DM metadata may not be compressed under these other approaches, and may need a fixed number of overhead bits regardless how much of a given bitrate a video elementary stream (e.g., comprising image data, MPEG video elementary stream, packetized elementary stream, etc.) other than the image metadata takes.

For example, the L1 metadata may contain three parameters such as maximum, minimum and average luminance values, each of which parameters may be 12 bits. L4 metadata may contain two parameters such as descriptive statistics/definitions (e.g., geometric mean, medium, mode, variance, or standard deviation) in luminance and/or chrominance distributions, each of which parameters may be 12 bits. The bits for these parameters in L1 and L4 metadata may be generated and delivered for each image frame.

Under the other approaches that do not implement the techniques as described herein, each extension block needs certain overheads. For example, an extension block with a 12-bit payload needs 27 bits in the coded bitstream. An extension block with a 24—bit payload needs 37 bits in the coded bitstream. An extension block with 36-bit payload needs 53 bits in the coded bitstream. Thus, overheads used to carry metadata parameters of various DM levels are rather significant (e.g., 30%-50%, etc.), and are likely to be too large to be accommodated in relatively low bit rate video streaming (e.g., SDR video streaming, adaptive streaming, etc.).

Techniques as described herein can be used to compress the DM metadata with some or all of (1) backward compatibility, (2) flexibility, and (3) compression efficiency. To provide backward compatibility, the compression methods may reuse some or all of an extension block architecture that is supported by a wide range of media processing devices.

As noted, a first decoder that has already been deployed in the field can receive a newly created coded bitstream with a compression format as described herein. The first decoder may not recognize new extension blocks as compressed/encoded with the compression methods as described herein; but can fall back to use default values (e.g., DM static values, etc.) available or accessible to the decoder. As a result, the first decoder can keep decoding even the newly created coded bitstream, process/handle the compression format, and render images at a reasonable quality with interpretable or default values. In dynamically adaptive streaming scenarios, the first decoder may even avoid streaming some or all of the DM metadata such as the new extension blocks that the first decoder does not recognize.

A (e.g., new, etc.) decoder that recognizes the new extension blocks can decompress the new extension blocks to obtain values for metadata parameters of various DM levels in the DM metadata encoded in the coded bitstreams. Such a decoder can perform DM operations based on some or all of the values for the metadata parameters of the various DM levels in the DM metadata.

To provide flexibility, an extension block hierarchy may be implemented by techniques as described herein. The extension block hierarchy uses (a) sequence-level extension block(s), (b) frame-level extension block(s), (c) overhead-free payload extension block(s), and so forth. In some embodiments, extension block IDs that are present in the entire sequence of image frames may be grouped as sequence level information that is for example carried by the sequence level extension block(s). The sequence level information may correspond to or comprise a set of sequence-level parameters for the sequence of image frames. The sequence-level parameters may comprise a set of sequence-level indicators that indicate a specific set of metadata types (e.g., relating to extension block IDs) that are present in the entire sequence of image frames. As such, the sequence-level parameters can be said to represent a catalog of those metadata types (e.g., extension block IDs) that occur throughout the sequence of image frames. The sequence level information or the sequence level extension block(s) may be sent relatively infrequently when a refresh at sequence level is needed (e.g., sent with an Instant-Data-Refresh (IDR) image frame, program switching, bitrate switching, etc.). The frame-level extension block(s) (e.g., Frame-Present extension block(s), etc.) may signal presences of payload extension blocks (e.g., Frame Overhead-Free extension blocks, etc.) for some or all of the extension block IDs signaled at the sequence level to be present in the entire sequence of images. The frame-level extension blocks may correspond to or comprise a set of frame-present parameters, wherein each set of frame present parameters is generated for a respective image frame. The set of frame-present parameters for a given image frame comprises a specific set of frame-present indicators, wherein each frame-present indicator corresponds to a respective metadata type (e.g., extension block ID) in the specific set of metadata types indicated by the sequence-level information (e.g., sequence-level parameters). In some embodiments, the frame-level extension block(s) may include presence indicators (or flags) each of which indicates whether a payload extension block is present for a corresponding type of metadata at the frame level. At the level of frame-present indicators, each frame-present indicator may indicate, for the given image frame, whether its corresponding metadata type (e.g., extension block ID) is present for the given image frame. As such, each frame-present indicator can indicate presence of absence of the corresponding metadata type for the given image frame. Accordingly, the frame-present parameters can be (virtually) grouped into first frame-present indicators that indicate that their corresponding metadata type is present for the given image frame (and that metadata parameter values for these metadata types are to be encoded for the given image frame), and second frame-present indicators that indicate that their corresponding metadata type is absent for the given image frame (and that no metadata parameter values for these metadata types are to be encoded for the given image frame). Metadata types that are present for the given image frame can be referred to as first metadata types, whereas metadata types that are not present can be referred to as second metadata types. All payload extension blocks (as examples of metadata payloads) that are signaled at the frame level to be present (i.e., first metadata types whose corresponding frame-present indicators are first frame-present indicators) are bundled into an overhead-free payload body (e.g., no padding bits separating different presented types of metadata) at the frame level. In other words (only) metadata parameter values for the first metadata types are bundled into the overhead-free payload body. Needless to say, payload extension blocks (e.g., metadata types) that are signaled at the frame level to be not present (i.e., second metadata types whose corresponding frame-present indicators are second frame-present indicators) are not encoded for the given image frame. With the extension block hierarchy, relatively great flexibility and compression efficiency can be achieved at the same time.

To provide compression efficiency, in some embodiments, each metadata parameter of some or all metadata parameter in the DM metadata may be modeled with a prediction function (or a prediction polynomial) in time domain. The (temporal domain) prediction function can be linear (e.g., a first order polynomial, etc.) or nonlinear (e.g., a second order or higher order polynomial, a nonlinear non-polynomial function, etc.). A value of each such metadata parameter at a given time point (e.g., represented by the frame index of a corresponding image frame, etc.) can be predicted via the prediction function in time domain.

In cases in which a metadata parameter is modeled as the prediction function in time domain in the form of a first order polynomial, a slope and an offset for specifying the first order polynomial may be signaled by a video encoder to a video decoder, instead of directly signaling values of the actual values of the metadata parameter.

In some embodiments, a metadata parameter is modeled as the prediction function in the form of multiple pieces of first order polynomials. Multiple sets of slopes and offsets for specifying the multiple pieces of first order polynomials may be signaled by a video encoder to a video decoder, instead of directly signaling values of the actual values of the metadata parameter.

In some embodiments, the prediction function may be second order or higher order polynomials or other nonlinear functions. Polynomial coefficients or other functional parameters for specifying the second order or higher order polynomials or other nonlinear functions may be signaled by a video encoder to a video decoder, instead of directly signaling values of the actual values of the metadata parameter.

The video encoder can determine or recognize (e.g., peek ahead, etc.) changing points (or frame indexes at each of which the prediction error exceeds a maximum allowable error) in temporal domain prediction, and signal new set(s) of slopes and offsets or new functional parameters for specifying the prediction function such as different orders of polynomials, non-polynomial functions, and so forth.

The polynomial parameters used in the polynomial to predict a given value of the metadata parameter at the given time may be coded with specific coding syntax into payload extension blocks as described herein. The specific coding syntax may be used to code the polynomial parameters for the metadata parameter, depending on whether the metadata parameter is scene based or frame based. If the metadata parameter is a scene-based parameter, values of the metadata parameter may be constant or unchanged in a scene; thus, the polynomial parameters in the polynomial to represent such a metadata parameter may not (or do not need to) change within the scene. On the other hand, if the metadata parameter is a frame-based parameter, values of the metadata parameter may change from frame to frame, for example as filtered/smoothened values over time. Under techniques as described here, values of the metadata parameter that are either constant or varying over time may be predicted/determined using the polynomial (or a different prediction function) in time domain with the polynomial parameters (or different functional parameters) that can be relatively efficiently (e.g., 5:1 compression ratio, etc.) compressed and carried in coded bitstreams.

Temporal Domain Prediction of Metadata Parameters

Image metadata such as DM metadata may comprise a large number of metadata parameters whose values vary in time (e.g., as represented by the frame index of image frames).

Figure 3:
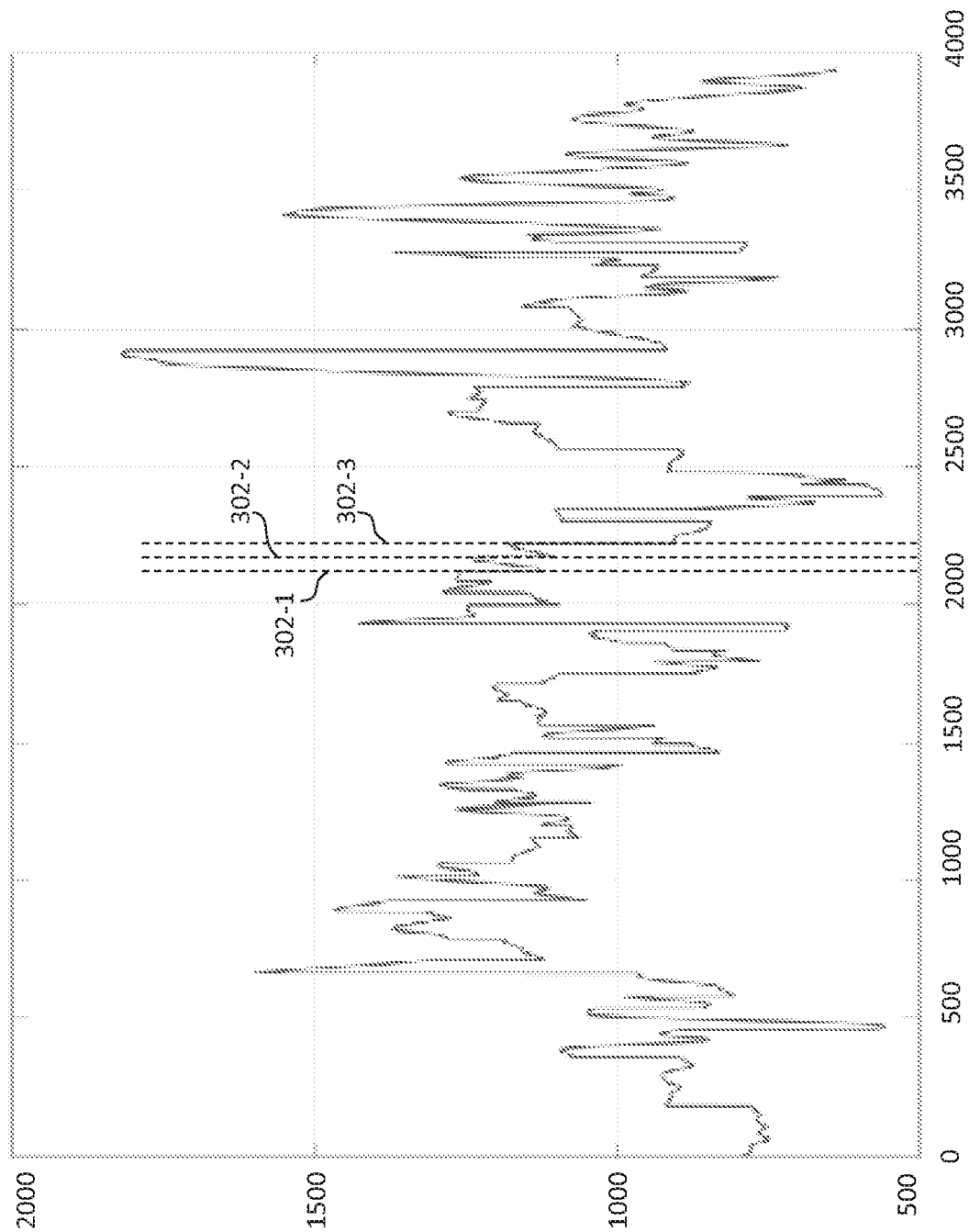
FIG. 3 illustrates an example plot of values of a frame-by-frame average luminance in image frames.

FIG. 3 illustrates an example plot of values of a frame-by-frame (or per-frame) average luminance in image frames (e.g., consecutive image frames of some or all of a media program, etc.) as represented by the vertical axis over a sequence of consecutive time points as represented by the horizontal axis. In some embodiments, each time point in the sequence of consecutive time points corresponds to a respective frame index value—in a sequence of frame index value for the sequence of images—for a respective image frame in the image frames.

It can be observed in FIG. 3, the per-frame average luminance for the most part varies relatively smoothly in time domain over the sequence of consecutive time points as represented by the sequence of frame index values. Some abrupt changes are due to new scene cuts such as at each of first, second and third time points 302-1 through 302-3.

However, in between neighboring time points where abrupt changes occur, the per-frame average luminance varies relatively smoothly. For example, between the first and second time points 302-1 and 302-2, the per-frame average luminance varies relatively smoothly. Likewise, between the second and third time points 302-2 and 302-3, the per-frame average luminance also vary relatively smoothly.

Many of time-varying metadata parameters in the image metadata may exhibit similar smooth trends over time like the per-frame average luminance Hence, values of the time-varying metadata parameters may be efficiently predicted, for most time points in the sequence of consecutive time points, in time domain based on smoothly varying functions such as polynomials approximating the smooth trends of the values of these time-varying metadata parameters over time, By way of illustration but not limitation, denote the value of a metadata parameter at image frame j as $m_j$. The value of the metadata parameter at frame j+f can be predicted using a first order polynomial with polynomial parameters/coefficients such as an offset $t_j$ and a slope $s_j$, as follows:

$$\hat{m}_{j+f} = t_j + f \cdot s_j. \quad (1)$$

Instead of sending values of the metadata parameter directly to recipient devices such as video decoders, polynomial parameters ($t_j$, $s_j$) may be signaled in a coded bitstream (e.g., 122, etc.).

Denote the distortion measurement (or prediction error) $d_{j,\,j+f}$ between the actual value of the metadata parameter as $m_{j+f}$ and the predicted value of the metadata parameter as $\hat{m}_{j+f}$, as follows:

$$d_{j,j+f} = D(\hat{m}_{j+f}, m_{j+f}). \quad (2)$$

One example of the distortion measurement can be absolute difference (e.g., mean absolute difference (MAD), etc.) between actual metadata value $m_{j+f}$ and predicted metadata value $\hat{m}_{j+f}$ as $$d_{j,j+f} = |\hat{m}_{j+f} - m_{j+f}|. \quad (3)$$

Denote the maximum acceptable distortion measurement (or threshold), for example for the entire sequences of image frames, as $\Delta$.

In response to determining (e.g., by the video encoder, etc.) that the (current) distortion measurement, $d_{j,\,j+f}$ is not larger than the maximum acceptable distortion measurement, $\Delta$, the predicted value, $\hat{m}_{j+f}$, may be used for the (current) value of the metadata parameter. For example, a mode flag $r_{j+f}$ (e.g., set to 0, etc.) may be used to signal the recipient devices to continue to use the current polynomial parameters for predicting the values of the metadata parameter.

On the other hand, in response to determining (e.g., by the video encoder, etc.) that the (current) distortion measurement, $d_{j,\,j+f}$ is larger than the maximum acceptable distortion measurement, $\Delta$, a new set of polynomial parameters ($t_{j+f}$, $s_{j+f}$) may be signaled to the recipient devices in the coded bitstream (122). Accordingly, the mode flag $r_{j+f}$ can be set (e.g., $r_{j+f}$=1, etc.) to signal that the new set of polynomial parameters is carried. The triplet ($r_j$, $t_j$, $s_j$) comprising the mode flag and the new set of polynomial parameters may be used to generate/predict values for the metadata parameter in time domain with an acceptable threshold as represented by the maximum acceptable distortion measurement $\Delta$.

Temporal domain prediction can be applied to both frame-based and scene-based metadata parameters. For the frame-based metadata parameters, the values of $s_j$ signaled to the recipient devices may be constant or time-varying within a scene. For the scene based metadata parameters, $s_j$=0 for the entire scene.

In some embodiments, the mode flag and the polynomial parameters for the metadata parameters may be signaled to the recipient devices in the coded bitstream using an example procedure as illustrated in TABLE 1 below.

TABLE 1

```
// initialization
    t = t_0 ; s = s_0 ; f = 0;
// for each frame sequentially for a F-frame sequence
for( j = 0 ; j < F ; j ++)
    // update predictor if new model is in the bitstream
    if ( r_j == 1 )
        t = t_j ;          s = s_j ;          f = 0;
    end
    // perform prediction
    m̂_j = t + f · s
End
```

To signal the (e.g., predicted, etc.) values of the metadata parameter by way of the mode flag and the polynomial parameters to the recipient devices (e.g., video decoders, etc.), an example coding syntax may be used by the video encoder to encode the mode flag and the polynomial parameters as a part of the image metadata in the coded bitstream (122), as shown in TABLE 2 below.

TABLE 2

|  | C | Descriptor |
|---|---|---|
| DM_comp_metadata( ) { |  |  |
|   DM_comp_mode | 0 | u(1) |
|   if( DM_comp_mode == 1 ) { |  |  |
|     DM_metadata_offset | 0 | u(12) |
|     DM_metadata_slope_value_int | 0 | s(6) |
|     DM_metadata_slope_value_frac | 0 | u(4) |
|   } |  |  |
| } |  |  |

In some embodiments, the coding syntax as illustrated in TABLE 2 may be used to pass respective mode flags and polynomial parameters for some or all metadata parameters at one or more DM levels that are to be signaled by the video encoder to the recipient devices. In some embodiments, some of these metadata parameters (e.g., L1 metadata, L4 metadata, etc.) may be signaled using the above coding syntax for each image frame in the sequence of (consecutive) image frames.

For each metadata parameter to be predicted in time domain, a syntax element "DM_comp_mode" represents a mode flag for the metadata parameter. If "DM_comp_mode" equals 1, the polynomial (or a temporal domain prediction function) used to predict values of the metadata parameter may be updated with (new) polynomial parameters represented by the syntax elements "DM_metadata_offset", "DM_metadata_slope_value_int", and "DM_metadata_slope_value_frac".

On the other hand, if "DM_comp_mode" equals 0, values of the metadata parameter can be predicted from the polynomial that is generated with polynomial parameters from the nearest past image frame with "DM_comp_mode" set to 1.

In TABLE 2, "DM_metadata_offset" specifies the offset in the (prediction) polynomial. "DM_metadata_slope_value_int" specifies the integer portion of the slope in the prediction polynomial. "DM_metadata_slope_value_frac" specifies the fractional portion of the slope in the prediction polynomial.

A recipient device that recognize this coding syntax may implement an example decoding process to retrieve predicted values of the metadata parameter, as follows:

DM_metadata_value=DM_metadata_offset+(DM_metadata_slope_value_int+DM_metadata_slope_value_frac>>4)*(current frame index−anchor frame index)  (3)

where ">>" represents a bit-level right shift operator; "current frame index" represents the frame index of a current image frame for which the value of the metadata parameter is to be predicted by the prediction polynomial; and "anchor frame index" represents the frame index of the nearest past frame with "DM_comp_mode" set to 1.

Coding Syntaxes for Hierarchical Extension Blocks

In some embodiments, compression methods used by a video encoder as described herein use hierarchical extension blocks comprising multiple tiers of extension blocks to encode image metadata including but not limited to DM metadata. By way of illustration but not limitation, a first tier of extension block is Sequence-Summary (SS) extension block(s) used to pass sequence level information; a second tier of extension block is Frame-Present (FP) extension block(s) used to pass frame level information; a third tier of extension block is Frame Overhead-Free Payload extension block(s) used to carry values (e.g., actual values, mode flag and polynomial parameters used to generate predicted values, etc.) of metadata parameters.

An example combined coding syntax used by the video encoder to encode SS extension block(s) and FP extension blocks is illustrated in TABLE 3 (in which "ext_dm_alignment_zero_bit" represents padding bit(s) with default value(s) such as zero for padding an extension block to a suitable byte or word boundary) below.

TABLE 3

| | Type |
|---|---|
| ext_block_payload( ext_block_length, ext_block_level ) { | |
|  ext_block_len_bits = 8 * ext_block_length | |
|  ext_block_use_bits = 0 | |
| ... | |
|  if( ext_block_level == FP ) { /* FP = 253 */ | |
|   for ( i = 0; i < seq_number_extension_block; i ++ ) { | |
|    seq_extension_block_present[i] | u(1) |
|    if( seq_extension_block_present[i] == 1 ){ | |
|     ext_block_payload_comp( seq_extension_block_level [i] ) | |
|    } | |
|   } | |
|   ext_block_use_bits += num_bits_in_this_block | |
|  } | |
|  if( ext_block_level == SS ) { /* SS = 254*/ | |
|   seq_number_extension_block | u(16) |
|   for ( i = 0; i < seq_number_extension_block; i ++ ) { | |
|    seq_extension_block_level[i] | u(8) |
|   } | |

TABLE 3-continued

| | Type |
|---|---|
|   ext_block_use_bits += 8 * seq_number_extension_block + 16 | |
|  } | |
| ... | |
|  while( ext_block_use_bits++ < ext_block_len_bits ) | |
|   ext_dm_alignment_zero_bit | f(1) |
| } | |

As can be seen in TABLE 3, the video encoder may implement the combined coding syntax that receives input parameters such as a first input parameter "ext_block_length" and a second input parameter "ext_block_level".

In response to receiving a value "SS" (e.g., a numeric value of 254, etc.) for the second input parameter "ext_block_level", the combined coding syntax implemented by the video encoder generates an SS extension block. On the other hand, in response to receiving a value "FP" (e.g., a numeric value of 253, etc.) for the second input parameter "ext_block_level", the combined coding syntax generates an FP extension block.

SS extension blocks may be used to signal sequence level information, and may only occur (e.g., encoded, transmitted, received, decoded, etc.) at specific frame indexes corresponding to IDR positions (e.g., refreshing, synchronization, program switching, bitrate switching, etc.) or other timewise positions in image frames (e.g., a common significant changing point for a relatively large number of time-varying metadata parameters, etc.) at which the video encoder determines that a sequence level need to be signaled or re-signaled. In some embodiments, for a sequence of image frames, at most one SS extension block may be sent/signaled by the video encoder to recipient devices (e.g., video decoders, etc.).

As illustrated in TABLE 3, an SS extension block may comprise a sequence-level parameter "seq_number_extension_block" and a sequence level parameter array "seq_extension_block_level[i]", in which the index "i" is a value between 0 and (seq_number_extension_block−1) inclusive and represents extension block IDs that will be present in the entire sequence of image frames for which the SS extension block is generated. The sequence-level parameter "seq_number_extension_block" specifies a total number for the extension block IDs present in the current sequence of image frames, in the range of 0 to 65535, inclusive. In some embodiments, if a specific value for the sequence-level parameter "seq_number_extension_block" is found, a default value such as zero (0) may be given to the parameter.

The sequence level parameter array "seq_extension_block_level[i]" carried in the SS extension blocks can be used by the video encoder to signal to the recipient devices to which DM levels the extension block IDs respectively correspond. The sequence level parameter array "seq_extension_block_level[i]" indicates DM levels for extension block IDs "i" present in the current sequence of image frames. In some embodiments, values in the sequence level parameter array "seq_extension_block_level [i]" are in the range of 1 to 252, inclusive. If the sequence level parameter array "seq_extension_block_level[i]" is not present, default values such as zero (0) may be given to some or all of the DM levels for extension block IDS "i" present in the current sequence of image frames.

FP extension blocks may be used to signal frame level information, and may occur (e.g., encoded, transmitted, received, decoded, etc.) at each image frame.

As illustrated in TABLE 3, an FP extension block for a corresponding image frame may comprise a frame-level parameter array "seq_extension_block_present[i]"; i is a value between 0 and (seq_number_extension_block−1) inclusive, and represents extension block IDs present in the entire sequence of image frames as indicated by the SS extension block for the sequence. The frame-level parameter array "seq_extension_block_present[i]" in the FP extension block may be used by the video encoder to indicate to the recipient devices which extension block IDs (as represented by "i") carry payload blocks in the third tier of extension blocks (or Frame Overhead-Free extension blocks). Additionally, optionally, or alternatively, the frame-level parameter array "seq_extension_block_present[i]" in the FP extension block may be used by the video encoder to pack all payload blocks one after another without any padding bits in these payload blocks and without any padding bits separating any adjacent payload blocks.

In some embodiments, only those metadata parameters (corresponding to extension block IDs with seq_extension_block_present[i] set to a special value such as 1) whose values need to be updated for the corresponding image frame have their respective payload blocks encoded by the video encoder. Other metadata parameters whose values need not to be updated for the corresponding image frame have no payload blocks encoded by the video encoder.

For example, in response to determining that a specific extension block ID "i" is indicated in the FP extension block for the corresponding image as needing update (e.g., seq_extension_block_present[i]==1, etc.), the video encoder can call a payload encoding routine "ext_block_payload_comp( . . . )". The DM level of the specific extension block ID "i", which has been set with the array of sequence-level parameters "seq_extension_block_level [i]" in the SS extension block for the entire sequence of image frames, is passed as an input parameter for the payload encoding routine "ext_block_payload_comp( . . . )". The payload encoding routine can use the DM level to encode updated values of metadata parameters at the DM level as indicated in the array of sequence-level parameters "seq_extension_block_level [i]". In some embodiments, temporal domain prediction may be used to generate concise payloads for updating some or all of values of these metadata parameters. In some embodiments, these payloads may be encoded using Frame Overhead-Free Payload extension blocks in the third tier of extension blocks.

On the other hand, in response to determining that a specific extension block ID "i" is indicated in the FP extension block for the corresponding image as not needing update (e.g., seq_extension_block_present[i]==0, etc.), the video encoder can avoid calling the payload encoding routine "ext_block_payload_comp( . . . )". The DM level of the specific extension block ID "i" for the specific extension block ID "i" has been set with the array of sequence-level parameters "seq_extension_block_level [i]" within the SS extension block for the entire sequence of image frames. Thus, in some embodiments, for the corresponding image frame, the video encoder does not generate any payload for updating values of metadata parameters associated with the extension block ID "i", if the frame-level parameter "seq_extension_block_present[i]" for the extension block ID "i" is set to a special value (e.g., 0, etc.) for no updating. For example, the previous metadata values of the metadata parameters or the previous polynomials used for temporal domain prediction of the values of the metadata parameters may continually be used to generate or provide the values of the metadata parameters for the corresponding image.

The payload encoding routine "ext_block_payload_comp( . . . )" may be represented by an example overall payload coding syntax used by the video encoder to encode Frame Overhead-Free Payload extension blocks for various DM levels, as illustrated in TABLE 4 below.

TABLE 4

| | Descriptor |
|---|---|
| ext_block_payload_comp ( ext_comp_block_level ) { | |
|   if( ext_comp_block_level == 1 ) | |
|     DM_comp_metadata1( ) | |
|   else if( ext_comp_block_level == 2 ) | |
|     DM_comp_metadata2( ) | |
|   else if( ext_comp_block_level == 3 ) | |
|     DM_comp_metadata3( ) | |
|   else if( ext_comp_block_level == 4 ) | |
|     DM_comp_metadata4( ) | |
|   else if( ext_comp_block_level == 5 ) | |
|     DM_comp_metadata5( ) | |
|   else if( ext_comp_block_level == 6 ) | |
|     DM_comp_metadata6( ) | |
| } | |

As can be seen in TABLE 4, based on the DM level passed in as an input parameter, the payload encoding routine "ext_block_payload_comp( . . . )" calls payload encoding subroutines "DM_comp_metadata1( )", "DM_comp_metadata2( )", "DM_comp_metadata3( )", "DM_comp_metadata4( )", "DM_comp_metadata5( )", "DM_comp_metadata6( )", and so forth.

The payload encoding subroutines may be represented by respective example specific payload coding syntaxes used by the video encoder to encode respective Frame Overhead-Free Payload extension blocks for various DM levels, as illustrated in TABLEs 5-10 below.

TABLE 5

| | Descriptor |
|---|---|
| DM_comp_metadata1( ) { | |
|   min_PQ | u(12) |
|   max_PQ | u(12) |
|   avg_PQ | u(12) |
| } | |

TABLE 6

| | Descriptor |
|---|---|
| DM_comp_metadata2( ){ | |
|   trim_appear_flag | u(1) |
|   If(trim_appear_flag ){ | |
|     target_max_PQ | u(12) |
|     trim_slope | u(12) |
|     trim_offset | u(12) |
|     trim_power | u(12) |
|     trim_chroma_weight | u(12) |
|     trim_saturation_gain | u(12) |
|   } | |
|   ms_weight | i(13) |
| } | |

TABLE 7

| | Descriptor |
|---|---|
| DM_comp_metadata3( ){ | |
|   min_PQ_offset | u(12) |
|   max_PQ_offset | u(12) |

TABLE 7-continued

| | Descriptor |
|---|---|
| avg_PQ_offset | u(12) |
| } | |

TABLE 8

| | Descriptor |
|---|---|
| DM_comp_metadata4(){ | |
| anchor_PQ | u(12) |
| anchor_power | u(12) |
| } | |

TABLE 9

| | Descriptor |
|---|---|
| DM_comp_metadata5( ){ | |
| active_area_left_offset | u(13) |
| active_area_right_offset | u(13) |
| active_area_top_offset | u(13) |
| active_area_bottom_offset | u(13) |
| } | |

TABLE 10

| | Descriptor |
|---|---|
| DM_comp_metadata6( ){ | |
| max_display_mastering_luminance | u(16) |
| min_display_mastering_luminance | u(16) |
| max_content_light_level | u(16) |
| max_frame_average_light_level | u(16) |
| } | |

As can be seen in TABLES 3 and 4, the coding syntaxes for encoding the image metadata may reference SS extension blocks, FP extension blocks and Frame Overhead-Free extension blocks with their respective extension block levels.

For example, the coding syntax in TABLE 3 references SS extension blocks with the value "SS" (e.g., the numeric value of 254, etc.) for the parameter "ext_block_level". The value "SS" (e.g., the numeric value of 254, etc.) represents a specific extension block level for the SS extension blocks.

The same coding syntax in TABLE 3 also references FP extension blocks with the value "FP" (e.g., the numeric value of 253, etc.) for the parameter "ext_block_level". The value "FP" (e.g., the numeric value of 253, etc.) represents a specific extension block level for the FP extension blocks.

The coding syntaxes in TABLEs 3 and 4 reference Frame Overhead-Free extension blocks with different values (e.g., the numeric values of 1, 2, 3, 4, 5, 6, etc.) for the parameters "seq_extension_block_level [i]" or the parameter "ext_comp_block_level". These different values (e.g., the numeric values of 1, 2, 3, 4, 5, 6, etc.) represent respective extension block levels for the Frame Overhead-Free extension blocks.

In some embodiments, different extension block levels for the Frame Overhead-Free extension blocks may correspond to different DM levels for metadata parameters carried in the Frame Overhead-Free extension blocks.

For example, the extension block level (1), as represented by the numeric value of 1 for the parameters "seq_extension_block_level [i]" or the parameter "ext_comp_block_level" in TABLE 4, of a Frame Overhead-Free extension block may correspond to a DM level such as "L1" for metadata parameters (e.g., "min_PQ", "max_PQ", "avg_PQ", etc.) for the Frame Overhead-Free extension block. Similarly, the extension block level (4), as represented by the numeric value of 4 for the parameters "seq_extension_block_level [i]" or the parameter "ext_comp_block_level" in TABLE 4, of a Frame Overhead-Free extension block may correspond to a DM level such as "L4" for metadata parameters (e.g., "anchor_PQ", "anchor_power", etc.) for the Frame Overhead-Free extension block.

Encoder Side Constraints

A video encoder that uses coding syntaxes for hierarchical extension blocks to encode image metadata may implement one or more encoder side constraints as follows.

In some embodiments, at most one SS extension block (e.g., level 254, etc.) is encoded in a coded bitstream (e.g., 122, etc.) for each image frame represented in the coded bitstream (122). In some embodiments, a single SS extension block is encoded for a sequence of image frames (e.g., corresponding to a part of a media program, etc.). Sequence level coding parameter values may be accessed through the single SS extension block for each image frame in the entire sequence of image frames.

In some embodiments, the single SS extension block encoded for the sequence of image frames is accompanied (e.g., followed, etc.) by an FP extension block, which may be encoded for a specific image frame such as the first image frame in the sequence of image frames, and which may be used to fully determine (e.g., initial, etc.) values of metadata parameters (for the specific image frame) corresponding to all extension block IDs indicated by the single SS extension block as present in the entire sequence of image frames.

In some embodiments, an SS extension block (e.g., level 254, etc.) may be encoded for a corresponding sequence of image frames rather than each image frame represented in the coded bitstream (122). In some embodiments, some or all of sequence level information in a previous SS extension block for a previous image frame or for a previous sequence of image frames may be reused by a later image frame or a later sequence of image frames in the coded bitstream (122).

In some embodiments, the SS extension block (level 254) is encoded by the video encoder in the coded bitstream (122) earlier than all FP extension blocks (level 253) in the coded bitstream (122) if the SS extension block (level 254) is needed by these FP extension blocks. This is to ensure that correct sequence level values are read from the SS extension block (level 254) before the FP extension blocks (level 253) that refer to these sequence level values are decoded.

Encoder side constraints may also be used to support or enforce backward compatibility. Media devices that support different coding syntax versions may be deployed in the field at any given time. For example, media devices supporting a first coding syntax version for carrying L1 and L2 metadata may be released to the field first. Subsequently, media devices supporting a second coding syntax version for carrying L1, L2 and L4 may be released to the field. Further subsequently, media devices supporting a third coding syntax version for carrying L1, L2, L4 and L3 may be released to the field. In some embodiments, the first coding syntax version that is released the earliest is given a smaller version value than the subsequently released second coding syntax version, which in turn is given a smaller version value than the further subsequently released third coding syntax version. Thus, the earlier a coding syntax is released, the smaller in value the version of the coding syntax is assigned.

To ensure maximum backward compatibility, extension blocks carrying metadata parameters of newly supported extension block levels (or newly supported DM levels) in the newest coding syntax version, being associated with the largest version values of the coding syntax version, is placed last. As a result, media devices that do not support the newest coding syntax version still can recognize and retrieve a maximum number of metadata parameters from the extension blocks coded in the newest coding syntax version.

Consider an example in which first video decoders are capable of decoding L1 and L2 metadata introduced in coding syntax version 1; second video decoders are capable of decoding L1 and L2, as well as L4 metadata introduced in coding syntax version 2; and third video decoders are capable of decoding L1, L2 and L4, as well as L3 metadata introduced in coding syntax version 3. Version values such as 1 (L1 and L2 metadata), 2 (L1, L2 and L4 metadata) and 3 (L1, L2, L4 and L3 metadata) may be used to order extension blocks in any of these three coding syntax versions 1, 2 and 3. For example, in the newest coding syntax version (e.g., version 3 in the present example, etc.), extension blocks will be ordered such that supported metadata in the coding syntax version 1 such as L1 and L2 metadata is encoded before newly supported metadata in version 2 such as L4 metadata, which in turn is encoded before the newest supported metadata in version 3 such as L3 metadata.

As a result, the first video decoders, which supports coding syntax version 1, can retrieve L1 and L2 metadata from the extension blocks even when these extension blocks are coded in the coding syntax version 3. The first video decoders do not recognize L4 metadata, and may use default values for metadata parameters in L4 metadata, ignore these metadata parameter in L4 metadata, etc.

The second video decoders, which supports coding syntax versions 1 and 2, can retrieve L1, L2 and L4 metadata from the extension blocks even when these extension blocks are coded in the coding syntax version 3. The second video decoders do not recognize L3 metadata, and may use default values for metadata parameters in L3 metadata, ignore these metadata parameter in L3 metadata.

In some embodiments, the payload extension blocks can be ordered in the ascending order of the version values of the different coding syntax versions by way of ordering the sequence level parameter array "seq_extension_block_level [i]" as indicated in the sequence level extension block.

In the present example, first extension blocks levels corresponding to the DM levels L1 and L2 may appear in the sequence level parameter array "seq_extension_block_level [i]" first, followed by second extension blocks levels corresponding to the DM level L4, and further followed by third extension blocks levels corresponding to the DM level L3.

As a result, when the sequence level parameter array "seq_extension_block_level[i]" is used in encoding FP extension block, the first extension block levels are first processed and any present flags or any payload extension blocks at the first extension block levels will be encoded first, followed by the second extension block levels and any present flags or any payload extension blocks at the second extension block levels, and further followed by the third extension block levels and any present flags or any payload extension blocks at the third extension block levels. Likewise, when the sequence level parameter array "seq_extension_block_level[i]" is used in decoding FP extension block and payload extension blocks, the first extension block levels are first processed and any present flags or any payload extension blocks at the first extension block levels will be decoded first, followed by the second extension block levels and any present flags or any payload extension blocks at the second extension block levels, and further followed by the third extension block levels and any present flags or any payload extension blocks at the third extension block levels.

Overheads and Compression Efficiency

For an image frame (e.g., IDR frame, a non-IDR image, etc.) that a video encoder selects for an overall metadata refresh (e.g., different metadata parameters, a refresh of all or substantially all values for the metadata parameters, etc.), both an SS extension block and an FP extension block (e.g., including but not limited to Frame Overhead-Free extension blocks attendant to the FP extension block, etc.) can be sent. For the rest of image frames, the video encoder may only send FP extension blocks and any Frame Overhead-Free extension blocks respectively attendant to the FP extension blocks. Even if the SS extension block is counted as overheads, such overheads are relatively small, since the overheads of the SS extension block can be amortized over multiple image frames in a sequence of image frames for which the SS extension block is generated. Thus, as SS extension blocks are used relatively infrequently, the overheads from the SS extension blocks are relatively small, overall speaking.

Example sequences of image frames and extension blocks for the example sequences of image frames are shown in TABLE 11 below.

TABLE 11

| Frame index | Frame type (IDR/P/B) | Extension Blocks (SS, FP) |
| --- | --- | --- |
| 0 | IDR | SS, FP |
| 1 | B | FP |
| 2 | P | FP |
| 3 | B | FP |
| 4 | IDR | SS, FP |
| 5 | P | FP |

Consider an operational scenario in which DM metadata includes three extension block levels (as indicated by the sequence level parameter array "seq_extension_block_level [i]" in the coding syntaxes in TABLE 3). The first extension block level has 36 bits (such as L1 metadata). The second extension block level has 36 bits (such as L1 metadata). The third extension block level has 24 bits (such as L4 metadata in TABLE 8).

Thus, there are eight (8) parameters totaling to 24+36+ 36=96 bits of payload. In other approaches that do not implement compression methods as described herein, 37 bits may be used to encode 24 bits (in L4 metadata), and 53 bits may be used to encode 36 bits (in L1 metadata). Thus, under these other approaches, a total of 37+53+53=143 bits may be needed to encode the 2×36 bits (in L1 metadata) and 24 bits (in L4 metadata).

Under techniques as described herein, a significantly fewer number of bits can be used to transmit the same metadata, even without using temporal domain prediction.

For example, when an SS extension block is not encoded, transmitted, received and decoded for frame indexes 1-3 and 5 in TABLE 11, the FP extension block (including its attendant Frame Overhead-Free extension blocks) may comprise a parameter "ext_block_length" coded in unsigned integer Exp-Golomb-coded syntax, which takes seven (7) bits in this example. The FP extension block comprises a parameter array "seq_extension_block_present", which takes three (3) bits for three (3) Frame Overhead-Free extension blocks (one or L4 metadata and two for L1 metadata). The Frame Overhead-Free extension blocks takes 96 bits for carrying the L1 and L4 metadata. Finally, the SS and FP extension blocks takes five (5) bits of ext_dm_alignment_zero_bit for padding (e.g., 3+96+5 for alignment to the byte boundary). Thus, the FP extension block (including its attendant Frame Overhead-Free extension blocks) uses a total of 7+3+96+5=111 bits, including the Exp-Golomb-coded "ext_block_length". As a result, when the SS extension block is not transmitted at frame indexes 1-3 and 5, the total number of bits under techniques as described herein is still 16+16=32 bits fewer than the total number (143) of bits under the other approaches.

Compression efficiency can be further improved by using temporal domain prediction for metadata parameters whose values are to be carried in Frame Overhead-Free extension blocks. For example, if at frame index 3 in TABLE 11, all the previously signaled temporal domain prediction functions (or polynomials) for L1 and L4 metadata are still valid, there is no need to include or signal any Frame Overhead-Free extension blocks (e.g., two metadata parameters for L4 metadata as shown in TABLE 8, etc.). As a result, when the SS extension block is not transmitted at frame index 3 and when the prediction functions (or polynomials) need not to be updated, the total number (e.g., 27 bits, etc.) of bits under techniques as described herein is much fewer than the total number (143) of bits under the other approaches.

Additionally, optionally or alternatively, even when an Frame Overhead-Free extension block is needed for a set of metadata parameters such as L1 metadata or L4 metadata, not all the metadata parameters in the set may have updates for their prediction functions (or polynomials). For those metadata parameters that do not need updates to their prediction functions (or polynomials), a single bit mode flag can be used in the Frame Overhead-Free extension block for each of those metadata parameters to indicate no update to the prediction function (or polynomial) for each such metadata parameter. Thus, the Frame Overhead-Free extension block may still be relatively small, when some metadata parameters included in the Frame Overhead-Free extension block do not need to update their prediction functions (or polynomials) and/or when only the single-bit mode flags are used for those metadata parameters.

It should be noted that in various embodiments, a video encoder as described herein may use temporal domain prediction or any other method (not necessarily based on temporal domain prediction) to signal predicted or non-predicted (e.g., actual, etc.) values of non, some or all of metadata parameters in image data including DM metadata.

It should also be noted that in various embodiments, a video encoder as described herein may identify an IDR frame (as illustrated in TABLE 11) or a non-IDR frame (e.g., a P frame, a B frame, etc.) as the starting point of a sequence of image frames at which starting point sequence level summary information is to be signaled. For example, the video encoder may recognize that there are many metadata parameters that need to be updated with new parameters for prediction functions used to predict values of these metadata parameters, to the point that the total number of such metadata parameters exceeds a maximum allowable number. In response, the video encoder may start a new sequence of image frames and send sequence level summary information, for example in a new SS extension block.

In some embodiments, multiple instances of a specific set of metadata parameters at a specific DM level may be signaled by the video encoder to the video decoder for (e.g., each image frame in, etc.) a sequence of image frames. Each instance of the specific set of metadata may be used by a recipient device such as the video decoder as a basis to perform a specific image processing operation or to perform a specific set of image processing operations. For example, multiple instances of L1 metadata (at DM level L1) may be signaled by the video encoder to the video decoder for (e.g., each image frame in, etc.) the sequence of image frames. Multiple different image processing operations or multiple different sets of image processing operations may be performed by a recipient device based at least in part on the multiple instances of L1 metadata. Similarly, multiple instances of L2 metadata (at DM level L2), L3 metadata (at DM level L3), L4 metadata (at DM level L4), and so forth, may be signaled by the video encoder to the video decoder for (e.g., each image frame in, etc.) the sequence of image frames. Multiple different image processing operations or multiple different sets of image processing operations may be performed by a recipient device based at least in part on the multiple instances of L2 metadata, L3 metadata, L4 metadata, and so forth.

In some embodiments, all (or aggregated) multiple instances of sets of metadata parameters at all DM levels for the sequence of image frames may be indicated by the parameter "seq_number_extension_block" in the SS extension block for the sequence of image frames. The parameter "seq_number_extension_block" can be a numeric value represented by one of: 8 bits, 16 bits, or another number of bits that may or may not be byte-aligned.

For the purpose of illustration only, it has been sometimes described that image metadata such as DM metadata may be signaled using hierarchical extension blocks and/or temporal domain prediction for SDR images in an input video signal as described herein to allow downstream devices to receive or predict values of metadata parameters for image processing operations relating to the SDR images and/or for generating target display images for target displays.

It should be noted, however, that in various embodiments, images of an input dynamic range and/or an input color gamut in an input video signal may or may not be SDR images such as those specified in Rec. 709. For example, in some embodiments, hybrid-log-gamma (HLG) images of an input dynamic range (e.g., 4000 nits, 1000 nits, etc.) other than one of Rec. 709 SDR may be decoded from an input video signal as described herein Image metadata such as DM metadata may be signaled using hierarchical extension blocks and/or temporal domain prediction for the HLG images to allow downstream devices to receive or predict values of metadata parameters for image processing operations relating to the HLG images and/or for generating target display images for target displays.

Example Process Flows

FIG. 4A illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, etc.) may perform this process flow. In block 402, an image processing device (e.g., coding block (120), etc.) generates a set of sequence-level parameters for a sequence of image frames in a media program, the set of sequence-level parameters comprising a set of sequence-level indicators for indicating a specific set of metadata types that are present for each image frame in the sequence of image frames.

In block 404, the image processing device generates a sequence of sets of frame-present parameters for the sequence of image frames, each set of frame-present parameters in the sequence of sets of frame-present parameters being generated for a respective image frame in the sequence of image frames. A specific set of frame-present parameters generated for a specific image frame in the sequence of image frames comprises a specific set of frame-present indicators corresponding to the specific set of metadata types as indicated in the set of sequence-level parameters. The specific set of frame-present indicators includes first frame-present indicators identifying first metadata types for which metadata parameter values are to be encoded in a coded bitstream as metadata payloads. The specific set of frame-present indicators includes second frame-present indicators identifying second metadata types for which no metadata parameter values are to be encoded in the coded bitstream.

In block 406, the image processing device encodes the sequence of image frames, the set of sequence-level parameters, the specific set of frame-present parameters and the metadata payloads in the coded bitstream.

In block 408, the image processing device causes a recipient device of the coded bitstream to generate, from the specific image frame based at least in part on the metadata parameter values determined for the first metadata types, a target display image for a target display.

In an embodiment, the sequence of image frames represents a sequence of consecutive image frames in the media program.

In an embodiment, the set of sequence-level parameters is transmitted in the coded bitstream as a sequence-summary metadata block; the individual set of frame-present parameters is transmitted in the coded bitstream as a frame-present metadata block; the metadata payloads are transmitted in the coded bitstream as a frame overhead-free metadata block.

In an embodiment, the set of sequence-level parameters, the individual set of frame-present parameters and the metadata payloads are transmitted in the coded bitstream as a single bit block formed by consecutive bits.

In an embodiment, the set of sequence-level parameters, the individual set of frame-present parameters and the metadata payloads are transmitted in the coded bitstream without being separated by padding bits for alignment.

In an embodiment, the metadata payloads are transmitted in the coded bitstream next to one another without being separated by padding bits for alignment.

In an embodiment, at least one of the metadata payloads carries a set of functional parameters for specifying a temporal domain prediction function that generates temporal domain predicted values for a metadata parameter to be used in image processing operations in connection with the specific image frame.

In an embodiment, the temporal domain prediction function represents one of: a temporal domain constant, a first-order polynomial in time domain, a second-order or higher order polynomial in time domain, a set of piece-wise functions, a non-polynomial function, etc.

In an embodiment, the sequence of image frames starts at the specific image frame; the set of sequence-level parameters is transmitted with the specific image frame, the specific set of frame-present parameters and the metadata payloads.

In an embodiment, the specific image frame is selected from a set of images including the sequence of image frames based on one or more selection criteria.

In an embodiment, the one or more selection criteria include one or more maximum allowable prediction errors for one or more metadata parameters.

In an embodiment, the one or more selection criteria include a maximum allowable total number of metadata parameters that need to update temporal domain prediction functions.

In an embodiment, the specific image frame represents one of: an Instant-Data-Refresh (IDR) image frame, a non-IDR image frame, an image frame corresponding to program switching, an image frame corresponding to bitrate switching, etc.

In an embodiment, the image processing device is further configured to perform: dividing a set of image frames constituting the media program into a plurality of sequences of image frames that include the sequence of image frames; generating an individual set of sequence-level parameters for each sequence of image frames in the plurality of sequences of image frames, the individual set of sequence-level parameters comprising a set of sequence-level indicators for indicating a set of metadata types that are present for each frame in each such sequence of image frames.

In an embodiment, the set of sequence-level parameters is transmitted in the coded bitstream for all image frames in the sequence of image frames at most once.

In an embodiment, the sequence of image frames represent one of: a sequence of standard dynamic range (SDR) images, a sequence of high dynamic range (HDR) images, a sequence of hybrid log gamma (HLG) images, etc.

Figure 4B:
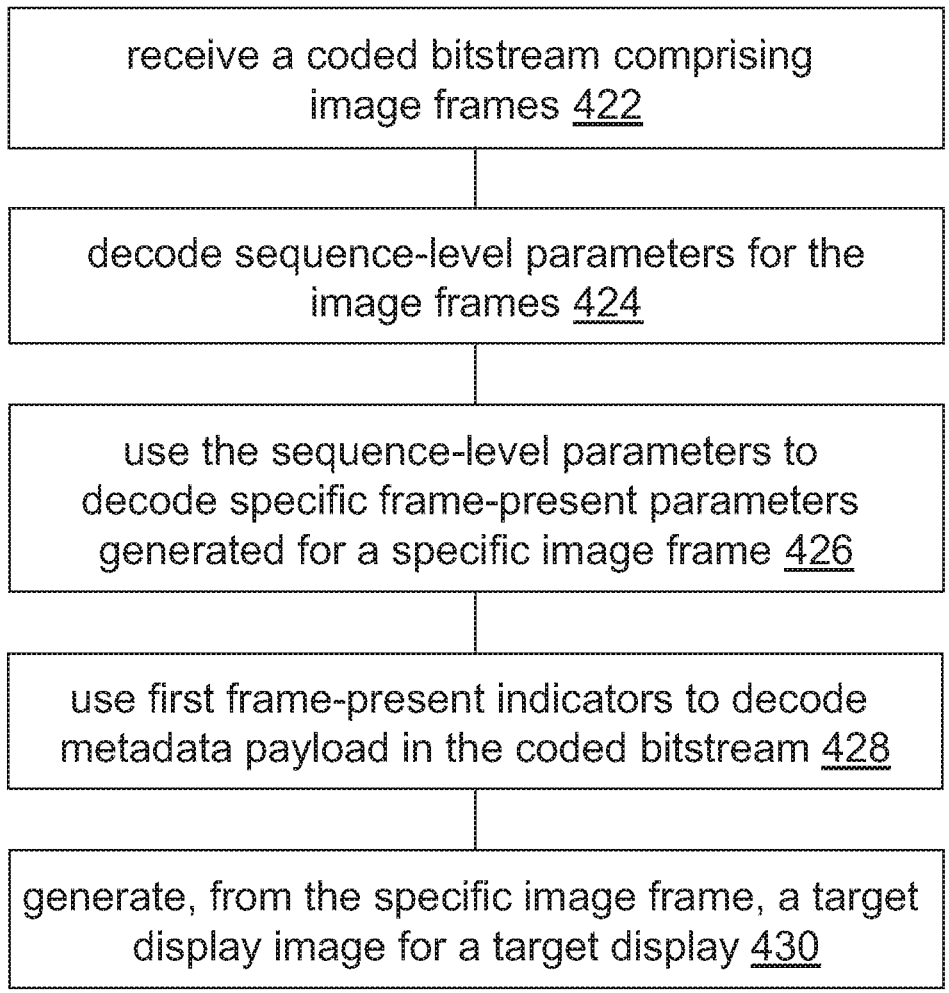

FIG. 4B illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, etc.) may perform this process flow. In block 422, an image processing device (e.g., decoding block (130), etc.) receives a coded bitstream comprising a sequence of image frames in a media program.

In block 424, the image processing device decodes a set of sequence-level parameters for the sequence of image frames, the set of sequence-level parameters comprising a set of sequence-level indicators for indicating a specific set of metadata types that are present for each image frame in the sequence of image frames.

In block 426, the image processing device uses the set of sequence-level parameters to decode a specific set of frame-present parameters that were generated for a specific image frame in the sequence of image frames. The set of frame-present parameters comprises a specific set of frame-present indicators corresponding to the specific set of metadata types as indicated in the set of sequence-level parameters. The specific set of frame-present indicators includes first frame-present indicators identifying first metadata types for which metadata parameter values were encoded for the specific image frame in the coded bitstream as metadata payloads. The specific set of frame-present indicators includes second frame-present indicators identifying second metadata types for which no metadata parameter values have been encoded for the specific image frame in the coded bitstream.

In block 428, the image processing device uses the first frame-present indicators to decode the metadata payload in the coded bitstream.

In block 430, the image processing device generates, from the specific image frame based at least in part on the metadata parameter values determined for the first metadata types, a target display image for a target display.

In an embodiment, the set of sequence-level parameters, the specific set of frame-present parameters and the metadata payloads are carried in an input video signal as image metadata separate from the sequence of image frames.

In an embodiment, the metadata payloads include metadata parameters for one or more display management (DM) levels.

In an embodiment, the image processing device is further configured to perform: extracting display management (DM) metadata from the metadata payloads; using the DM metadata to perform one or more DM operations on the specific image frame as a part of generating the target display image. In an embodiment, the image processing device is further configured to perform: extracting non-display management (DM) metadata from the metadata payloads; using the non-DM metadata to perform one or more non-DM operations on the specific image frame as a part of generating the target display image.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to adaptive perceptual quantization of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
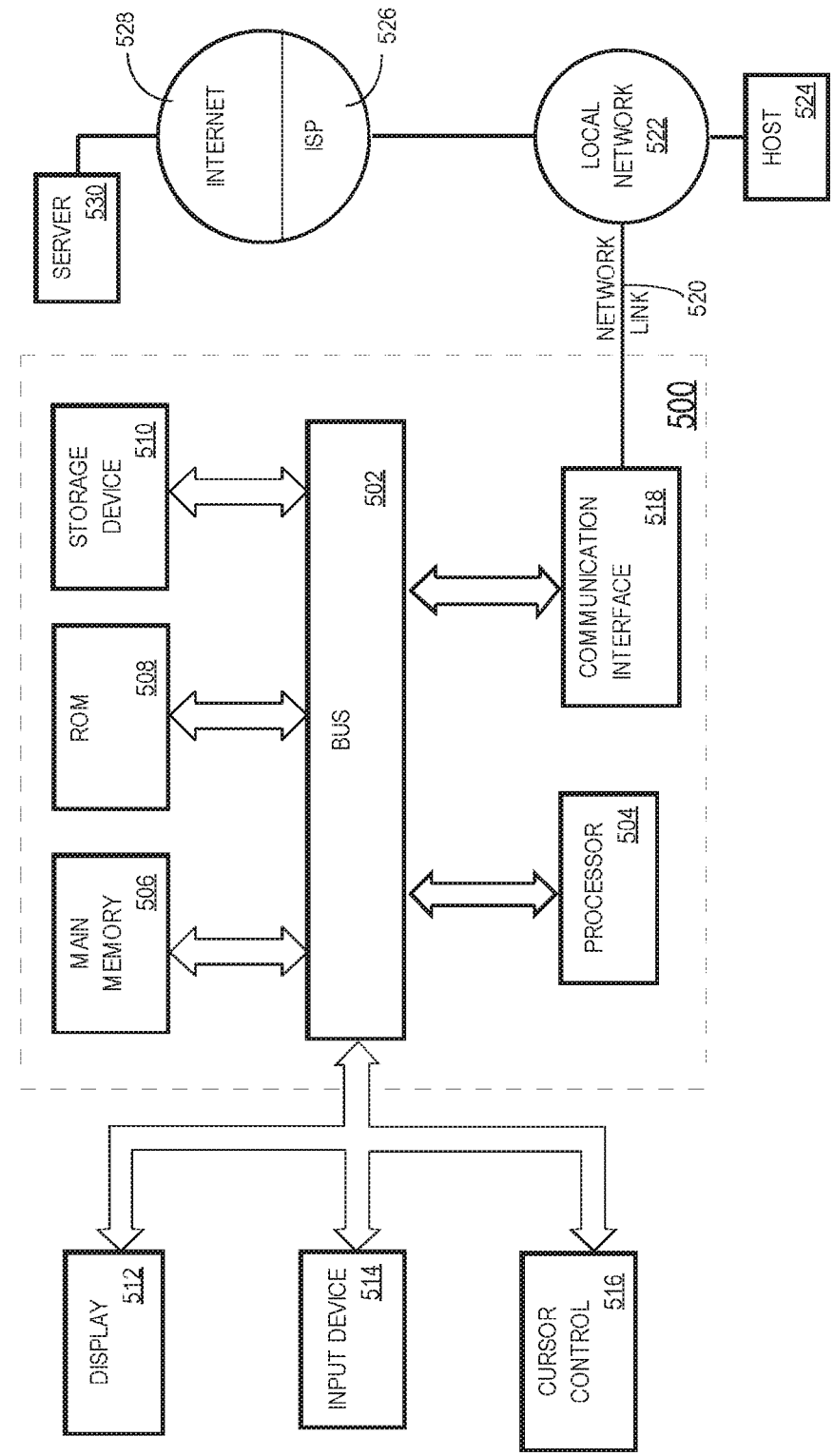
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE1. A method comprising:
  generating a set of sequence-level parameters for a sequence of image frames in a media program, the set of sequence-level parameters comprising a set of sequence-level indicators for indicating a specific set of metadata types that are present for each image frame in the sequence of image frames;
  generating a sequence of sets of frame-present parameters for the sequence of image frames, each set of frame-present parameters in the sequence of sets of frame-present parameters being generated for a respective image frame in the sequence of image frames;
  wherein a specific set of frame-present parameters generated for a specific image frame in the sequence of image frames comprises a specific set of frame-present indicators corresponding to the specific set of metadata types as indicated in the set of sequence-level parameters;
wherein the set of frame-present indicators includes first frame-present indicators identifying first metadata types for which metadata parameter values are to be encoded in a coded bitstream as metadata payloads;
wherein the set of frame-present indicators includes second frame-present indicators identifying second metadata types for which no metadata parameter values are to be encoded in the coded bitstream;
encoding the sequence of image frames, the set of sequence-level parameters, the specific set of frame-present parameters and the metadata payloads in the coded bitstream;
causing a recipient device of the coded bitstream to generate, from the specific image frame based at least in part on the metadata parameter values determined for the first metadata types, a target display image for a target display.

EEE2. The method of EEE 1, wherein the sequence of image frames represents a sequence of consecutive image frames in the media program.

EEE3. The method of EEE 1 or EEE 2, wherein the set of sequence-level parameters is transmitted in the coded bitstream as a sequence-summary metadata block, wherein the individual set of frame-present parameters is transmitted in the coded bitstream as a frame-present metadata block, and wherein the metadata payloads are transmitted in the coded bitstream as a frame overhead-free metadata block.

EEE4. The method of any of EEEs 1-3, wherein the set of sequence-level parameters, the individual set of frame-present parameters and the metadata payloads are transmitted in the coded bitstream as a single bit block formed by consecutive bits.

EEE5. The method of EEE 4, wherein the set of sequence-level parameters, the individual set of frame-present parameters and the metadata payloads are transmitted in the coded bitstream without being separated by padding bits for alignment.

EEE6. The method of any of EEEs 1-5, wherein the metadata payloads are transmitted in the coded bitstream next to one another without being separated by padding bits for alignment.

EEE7. The method of any of EEEs 1-6, wherein at least one of the metadata payloads carries a set of functional parameters for specifying a temporal domain prediction function that generates temporal domain predicted values for a metadata parameter to be used in image processing operations in connection with the specific image frame.

EEE8. The method of any of EEEs 1-7, wherein the temporal domain prediction function represents one of: a temporal domain constant, a first-order polynomial in time domain, a second-order or higher order polynomial in time domain, a set of piece-wise functions, or a non-polynomial function.

EEE9. The method of any of EEEs 1-8, wherein the sequence of image frames starts at the specific image frame, and wherein the set of sequence-level parameters is transmitted with the specific image frame, the specific set of frame-present parameters and the metadata payloads.

EEE10. The method of EEE 9, wherein the specific image frame is selected from a set of images including the sequence of image frames based on one or more selection criteria.

EEE11. The method of EEE 10, wherein the one or more selection criteria include one or more maximum allowable prediction errors for one or more metadata parameters.

EEE12. The method of EEE 10 or EEE 11, wherein the one or more selection criteria include a maximum allowable total number of metadata parameters that need to update temporal domain prediction functions.

EEE13. The method of any of EEEs 9-12, wherein the specific image frame represents one of: an Instant-Data-Refresh (IDR) image frame, a non-IDR image frame, an image frame corresponding to program switching, or an image frame corresponding to bitrate switching.

EEE14. The method of any of EEEs 1-13, further comprising:
dividing a set of image frames constituting the media program into a plurality of sequences of image frames that include the sequence of image frames;
generating an individual set of sequence-level parameters for each sequence of image frames in the plurality of sequences of image frames, the individual set of sequence-level parameters comprising a set of sequence-level indicators for indicating a set of metadata types that are present for each frame in each such sequence of image frames.

EEE15. The method of any of EEEs 1-14, wherein the set of sequence-level parameters is transmitted in the coded bitstream for all image frames in the sequence of image frames at most once.

EEE16. The method of any of EEEs 1-15, wherein the sequence of image frames represent one of: a sequence of standard dynamic range (SDR) images, a sequence of high dynamic range (HDR) images, or a sequence of hybrid log gamma (HLG) images.

EEE17. A method comprising:
receiving a coded bitstream comprising a sequence of image frames in a media program;
decoding a set of sequence-level parameters for the sequence of image frames, the set of sequence-level parameters comprising a set of sequence-level indicators for indicating a specific set of metadata types that are present for each image frame in the sequence of image frames;
using the set of sequence-level parameters to decode a specific set of frame-present parameters that were generated for a specific image frame in the sequence of image frames;
wherein the specific set of frame-present parameters comprises a specific set of frame-present indicators corresponding to the specific set of metadata types as indicated in the set of sequence-level parameters;
wherein the specific set of frame-present indicators includes first frame-present indicators identifying first metadata types for which metadata parameter values were encoded for the specific image frame in the coded bitstream as metadata payloads;
wherein the specific set of frame-present indicators includes second frame-present indicators identifying second metadata types for which no metadata parameter values have been encoded for the specific image frame in the coded bitstream;
using the first frame-present indicators to decode the metadata payload in the coded bitstream;
generating, from the specific image frame based at least in part on the metadata parameter values determined for the first metadata types, a target display image for a target display.

EEE18. The method of EEE 17, wherein the set of sequence-level parameters, the specific set of frame-present parameters and the metadata payloads are carried in an input video signal as image metadata separate from the sequence of image frames.

EEE19. The method of EEE 17 or EEE 18, wherein the metadata payloads include metadata parameters for one or more display management (DM) levels.

EEE20. The method of any of EEEs 17-19, further comprising:
extracting display management (DM) metadata from the metadata payloads;
using the DM metadata to perform one or more DM operations on the specific image frame as a part of generating the target display image.

EEE21. The method of any of EEEs 17-20, further comprising:
extracting non-display management (DM) metadata from the metadata payloads;
using the non-DM metadata to perform one or more non-DM operations on the specific image frame as a part of generating the target display image.

EEE22. A computer system configured to perform any one of the methods recited in EEEs 1-21.

EEE23. An apparatus comprising a processor and configured to perform any one of the methods recited in EEEs 1-21.

EEE24. A non-transitory computer-readable storage medium having stored thereon computer-executable instruction for executing a method in accordance with any of the EEEs 1-21.

What is claimed is:

1. A method of encoding video data with image metadata, the method comprising:
generating a set of sequence-level parameters for a sequence of image frames in a media program, the set of sequence-level parameters comprising a set of sequence-level indicators indicating a specific set of metadata types;
generating a sequence of sets of frame-present parameters for the sequence of image frames, each set of frame-present parameters in the sequence of sets of frame-present parameters being generated for a respective image frame in the sequence of image frames;
wherein the sequence of sets of frame-present parameters comprises a specific set of frame-present parameters generated for a specific image frame in the sequence of image frames;
wherein the specific set of frame-present parameters comprises a specific set of frame-present indicators, each frame-present indicator in the specific set of frame-present indicators indicating a respective one metadata type among the specific set of metadata types indicated by the set of sequence-level indicators;
wherein the specific set of frame-present indicators includes a first frame-present indicator identifying a first metadata type among the specific set of metadata types, wherein, for the first metadata type, one or more metadata parameter values are to be encoded for the specific image frame in a coded bitstream as a metadata payload in response to determining that a distortion measure computed for the first metadata type for the specific image frame exceeds a maximum distortion threshold; and
wherein the specific set of frame-present indicators includes a second frame-present indicator identifying a second metadata type among the specific set of metadata types, wherein, for the second metadata type, no metadata parameter value is to be encoded for the specific image frame in the coded bitstream; and
encoding, for the sequence of image frames, in a coded bitstream, the sequence of image frames, the set of sequence-level parameters, and the sequence of sets of frame-present parameters, wherein for the specific image frame, the one or more metadata parameter values are encoded as the metadata payload in the coded bitstream for the first metadata type, and no metadata parameter value is encoded in the coded bitstream for the second metadata type.

2. The method of claim 1, wherein the metadata parameter values determined for the first metadata type are suitable for generating, from the specific image frame, a target display image for a target display at a recipient device of the coded bitstream.

3. The method according to claim 1, wherein metadata payloads, including the metadata payload, for the specific frame are bundled into a payload body with no padding bits separating the metadata payloads.

4. The method of claim 1, wherein the sequence of image frames represents a sequence of consecutive image frames in the media program.

5. The method of claim 1, wherein the set of sequence-level parameters is transmitted in the coded bitstream as a sequence-summary metadata block, wherein the individual set of frame-present parameters is transmitted in the coded bitstream as a frame-present metadata block, and wherein metadata payloads, including the metadata payload, for the specific frame are transmitted in the coded bitstream as a frame metadata block with no padding bits separating the metadata payloads.

6. The method of claim 1, wherein the set of sequence-level parameters, the individual set of frame-present parameters and metadata payloads, including the metadata payload, for the specific frame are transmitted in the coded bitstream as a single bit block formed by consecutive bits.

7. The method of claim 6, wherein the set of sequence-level parameters, the individual set of frame-present parameters and the metadata payloads, are transmitted in the coded bitstream without being separated by padding bits for alignment.

8. The method of claim 1, wherein metadata payloads, including the metadata payload, for the specific frame are transmitted in the coded bitstream next to one another without being separated by padding bits for alignment.

9. The method of claim 1, wherein at least one of metadata payloads, including the metadata payload, for the specific frame carries a set of functional parameters for specifying a temporal domain prediction function that generates temporal domain predicted values for a metadata parameter to be used in image processing operations in connection with the specific image frame.

10. The method of claim 9, wherein the temporal domain prediction function represents one of: a temporal domain constant, a first-order polynomial in time domain, a second-order or higher order polynomial in time domain, a set of piece-wise functions, or a non-polynomial function.

11. The method of claim 1, wherein the sequence of image frames starts at the specific image frame, and wherein the set of sequence-level parameters is transmitted with the specific image frame, the specific set of frame-present parameters and the metadata payloads.

12. The method of claim 11, wherein the specific image frame is selected from a set of images including the sequence of image frames based on one or more selection criteria.

13. The method of claim 12, wherein the one or more selection criteria include one or more maximum allowable prediction errors for one or more metadata parameters.

14. The method of claim 13, wherein the one or more selection criteria include a maximum allowable total number of metadata parameters that need to update temporal domain prediction functions.

15. The method of claim 11, wherein the specific image frame represents one of: an Instant-Data-Refresh (IDR) image frame, a non-IDR image frame, an image frame corresponding to program switching, or an image frame corresponding to bitrate switching.

16. The method of claim 1, further comprising:
dividing a set of image frames constituting the media program into a plurality of sequences of image frames that include the sequence of image frames;
generating an individual set of sequence-level parameters for each sequence of image frames in the plurality of sequences of image frames, the individual set of sequence-level parameters comprising a set of sequence-level indicators for indicating a set of metadata types that are present for each frame in each such sequence of image frames.

17. The method of claim 1, wherein the set of sequence-level parameters is transmitted in the coded bitstream for all image frames in the sequence of image frames at most once.

18. The method of claim 1, wherein the sequence of image frames represent one of: a sequence of standard dynamic range (SDR) images, a sequence of high dynamic range (HDR) images, or a sequence of hybrid log gamma (HLG) images.

* * * * *